US012804488B2

(12) United States Patent
Perras et al.

(10) Patent No.: US 12,804,488 B2
(45) Date of Patent: Nov. 17, 2026

(54) PATH SWITCHING BETWEEN A Uu AND A PC5 INTERFACE

(71) Applicant: InterDigital Patent Holdings, Inc., Wilmington, DE (US)

(72) Inventors: Michelle Perras, Montreal (CA); Jung Je Son, Warrington, PA (US); Taimoor Abbas, Sainte-Julie (CA); Samir Ferdi, Kirkland (CA); Saad Ahmad, Montreal (CA); Xiaoyan Shi, Lake Oswego, OR (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/832,098

(22) PCT Filed: Jan. 27, 2023

(86) PCT No.: PCT/US2023/011748
§ 371 (c)(1),
(2) Date: Jul. 23, 2024

(87) PCT Pub. No.: WO2023/147060
PCT Pub. Date: Aug. 3, 2023

(65) Prior Publication Data

US 2025/0071637 A1 Feb. 27, 2025

Related U.S. Application Data

(60) Provisional application No. 63/390,384, filed on Jul. 19, 2022, provisional application No. 63/321,977,
(Continued)

(51) Int. Cl.
*H04W 36/00* (2009.01)
*H04L 5/00* (2006.01)
(Continued)

(52) U.S. Cl.
CPC ........... *H04W 36/03* (2018.08); *H04L 5/0055* (2013.01); *H04W 40/12* (2013.01); *H04W 40/34* (2013.01)

(58) Field of Classification Search
None
See application file for complete search history.

(56) References Cited

U.S. PATENT DOCUMENTS 10,212,102 B2 * 2/2019 Lee .................. H04W 28/0278
2016/0227451 A1 * 8/2016 Chung ............. H04W 36/0077
(Continued)

FOREIGN PATENT DOCUMENTS

WO WO 2021/045859 A1 3/2021
WO WO 2021/091115 A1 5/2021
(Continued)

OTHER PUBLICATIONS

3rd Generation Partnership Project (3GPP), "New SID on Study on System enhancement for Proximity based Services in 5GS—Phase 2; TSG SA Meeting #SP-94E, Electronic Meeting", SP-211653, Dec. 14-20, 2021, 5 pages.
(Continued)

*Primary Examiner* — Brian S Roberts
(74) *Attorney, Agent, or Firm* — Flaster Greenberg P.C.

(57) ABSTRACT

A wireless transmit receive unit (WTRU) may be configured to transmit on a first interface and determine to transmit on a second interface. The WTRU may receive configuration information. For example, the configuration information may include a path switching capability indication, a path switching policy, and an information sharing method indication. Based on the configuration information, the WTRU may determine to perform a path switch. In response to determining to perform a path switch, the WTRU may retrieve certain information associated with a peer WTRU.
(Continued)

The WTRU may transmit, based on the retrieved information, a path switch request to the peer WTRU. The WTRU may receive a response to the path switch request. If the response indicates that the path switch request has been accepted by the peer WTRU, the WTRU may perform a communication path switch from the first interface to a second interface.

20 Claims, 12 Drawing Sheets

Related U.S. Application Data filed on Mar. 21, 2022, provisional application No. 63/303,733, filed on Jan. 27, 2022.

(51) Int. Cl.
*H04W 40/12* (2009.01)
*H04W 40/34* (2009.01)

(56) References Cited

U.S. PATENT DOCUMENTS

2017/0099689 A1* 4/2017 Kalhan ................. H04W 48/16
2019/0037430 A1* 1/2019 Lee ..................... H04L 43/0882
2022/0232450 A1* 7/2022 Shariat .................... H04W 4/80
2022/0304085 A1* 9/2022 Lee ....................... H04W 76/23
2022/0417825 A1* 12/2022 Youn ..................... H04W 76/11
2023/0171671 A1* 6/2023 Paladugu .............. H04W 40/22 370/329
2023/0247513 A1* 8/2023 Paladugu .............. H04W 88/04 370/315
2024/0292309 A1* 8/2024 Dong .................... H04W 40/12

FOREIGN PATENT DOCUMENTS

WO WO 2021/125691 A1 6/2021
WO WO 2021/156254 A1 8/2021
WO WO 2021/163507 A1 8/2021

OTHER PUBLICATIONS

3rd Generation Partnership Project (3GPP), "Technical Specification Group Services and System Aspects; Proximity based Services (ProSe) in the 5G System (5GS) (Release 17)", TS 23.304 v17.1.0, Dec. 2021, 99 pages.
3rd Generation Partnership Project (3GPP), "Solution for path switch between PC5 and Uu", CATT, Huawei, HiSilicon, S2-1912400, SA WG2 Meeting #136, Nov. 18-22, 2019, 4 pages.
3rd Generation Partnership Project (3GPP), "Solution for KI#3: Direct Path Switching between PC5 and Uu (non-relay)", Interdigital, S2-2202957, 3GPP TSG-SA WG2 Meeting #150-4, Apr. 6-12, 2022, 4 pages.

* cited by examiner

PATH SWITCHING BETWEEN A Uu AND A PC5 INTERFACE

CROSS-REFERENCE TO RELATED APPLICATION

This application is the 371 National Stage of International Application No. PCT/US2023/011748, filed Jan. 27, 2023, which claims priority to U.S. Provisional Patent Application No. 63/303,733 filed in the United States of America on Jan. 27, 2022, to U.S. Provisional Patent Application No. 63/321,977 filed in the United States of America on Mar. 21, 2022, and to U.S. Provisional Application No. 63/390,384 filed in the United States of America on Jul. 19, 2022, the entire contents of each of which are incorporated herein by reference.

BACKGROUND

The 5G System has been enhanced to support a number of features, including, for example, proximity services, and direct communication path switching between a Uu interface (e.g., a communication interface between a WTRU and a gNB) and a PC5 interface (e.g., a communication interface between a first WTRU and a second WTRU).

SUMMARY

A wireless transmit/receive unit (WTRU) may be configured to transmit on a first interface and determine to transmit on a second interface. The WTRU may receive configuration information. For example, the configuration information may include a path switching capability indication (e.g., path switching is enable/disabled), a path switching policy, and/or an information sharing method indication. The path switching policy may include one or more of the following: a network triggered policy, a preferred interface driven policy, a link quality driven policy, and/or an application driven policy. Based on the configuration information, the WTRU may determine to perform a path switch. In response to determining to perform a path switch, the WTRU may retrieve certain information associated with a peer WTRU. For example, the retrieved information associated with the peer WTRU may enable the WTRU to perform a communication path switch. The WTRU may transmit, based on the retrieved information associated with the peer WTRU, a path switch request to the peer WTRU. The WTRU may receive a response to the path switch request transmitted to the peer WTRU. If the response indicates that the path switch request has been accepted by the peer WTRU, the WTRU may perform a communication path switch from the first interface to a second interface.

A WTRU may be configured to perform path switching, for example, between the Uu interface to the PC5 interface (or vice-versa). For example, WTRU's may be configured with path switching capabilities, configuration, policies, and/or the like.

In certain implementations, the WTRU may be configured to perform path switching based on one or more path switching policies and/or application layer triggers. For example, path switching enablement may be negotiated between peer WTRUs, for example, over the PC5 interface (e.g., using PC5 discovery, PC5 link establishment, and/or PC5 link modification techniques). The WTRU may receive a path switching trigger, for example, from the application layer or the network. Also, or alternatively, the WRTU may determine to perform path switching based on one or more path switching policies.

The WTRU may perform a path switch from the PC5 interface to Uu interface (or vice-versa). The WTRU may exchange (e.g., exchange across peer WTRUs) the IP addresses associated with already established protocol data unit (PDU) sessions. Also, or alternatively, PC5 link establishment procedures may be used to trigger path switching. The WTRU may exchange PDU session related information with peer WTRUs, for example, over the PC5 interface (e.g., using the keepalive mechanism). For example, the ProSe layer may retrieve information related to the PDU session (e.g., IP address) from the application layer.

WTRU path switching may be network-controlled and/or network assisted. For example, a WTRU registering to the network may specify its path-switching capability (e.g., enabled/disabled). Similarly, a WTRU may also, or alternatively, be provisioned with a path-switching capability (e.g., enabled/disabled). The network may trigger path switching at the WTRU. WTRU path switching may be supported by certain network functions, such as an access and mobility management function (AMF), a session management function (SMF), a user plane function (UPF), a Direct Discovery Name Management Function (DDNMF), a Network Data Analytics Function (NWDAF), and/or the like. Also, or alternatively, a path switching assistance function (PSAF) may be provided.

A WTRU may be configured to perform a path switch from the PC5 interface to the Uu interface with on-demand PDU session establishment. For example, WTRUs may be configured to establish PDU sessions during a path switching procedure.

A first WTRU may be configured to receive a message from a second WTRU via a PC5 communication link. For example, the message may indicate that the second WTRU is able to perform a path switch from the PC5 communication link to the Uu-based network communication link. A WTRU may be configured to determine that at least one trigger for performing the path switch has occurred. A first WTRU may be configured to send a path switching request to the second WTRU. A first WTRU may be configured to receive a path switching response from the second WTRU. For example, the path switching response may include an IP address of the second WTRU for communication via the Uu-based network communication link. A first WTRU may be configured to perform Protocol Data Unit (PDU) session establishment with a network node to establish a network-based PDU session based on, for example, receiving the path switching response. A first WTRU may be configured to send a path switching acknowledgement to the second WTRU. For example, the path switching acknowledgement may include an IP address of the first WTRU for communication via the Uu-based network communication link.

In examples, a first WTRU may be configured to receive a message from a network node indicating that path switching is allowed and/or one or more policies for implementing path switching.

In examples, the one or more triggers may include the first WTRU being in a location area where path switching is allowed, a PC5 link quality being below a threshold, an indication from an application, and/or a Uu link quality being above a threshold.

In examples, a first WTRU may be configured to determine that a link quality of the PC5 communication link is below a threshold. In examples, a first WTRU may be configured to determine that the one or more triggers for performing path switch has occurred based on the determination that the link quality of the PC5 communication interface fell below the threshold.

In examples, a first WTRU may be configured to send a response to the second WTRU. For example, the response may indicate that the first WTRU is able to perform a path switch from the PC5 communication link to the Uu-based network communication link.

In examples, a first WTRU may be configured to send a path switch request to the second WTRU based on a determination that one or more triggers have occurred and/or that the second WTRU is able to perform path switching.

In examples, the path switching request may indicate whether the PC5 communication link should be preserved after path switching. In examples, the path switching request may be sent to the second WTRU via the PC5 communication link, where the path switching response may be received from the second WTRU via the PC5 communication link. In examples, the path switching acknowledgement may be sent to the second WTRU via the PC5 communication link.

In examples, a first WTRU may perform a method with respect to path switching. Receiving a message from a second WTRU via a PC5 direct communication link, the message indicating that the second WTRU is able to perform a path switch from the PC5 direct communication link to the Uu-based network communication link. A method may include determining that one or more triggers for performing the path switch has occurred. A method may include sending a path switching request to the second WTRU. A method may include receiving a path switching response from the second WTRU. For example, the path switching response may include an IP address of the second WTRU for communication via the Uu-based network communication link. A method may include performing PDU session establishment with a network node to establish a network-based PDU session based on, for example, receiving the path switching response. A method may include sending a path switch acknowledgement to the second WTRU. For example, the path switch acknowledgement may include an IP address of the first WTRU for communication via the Uu-based network communication link.

In examples, the method may include receiving a message from a network node indicating that path switching is allowed and/or one or more policies for implementing path switching.

In examples, the one or more triggers may include the first WTRU being in a location where path switching is allowed, a PC5 link quality being below a threshold, an indication from an application, and/or a Uu link quality being above a threshold.

In examples, the method may include determining that a link quality of the PC5 communication link is below a threshold. In examples, the one or more triggers for performing the path switch has occurred based on the determination that the link quality of the PC5 communication interface fell below the threshold.

In examples, the method may include sending a response to the second WTRU. For example, the response may indicate that the first WTRU is able to perform a path switch from PC5 communication link to the Uu-based network communication link.

In examples, the method may include sending a path switch request to the second WTRU based on a determination that one or more triggers have occurred and/or that the second WTRU is able to perform path switching.

In examples, the path switching request indicating whether the PC5 communication link should be preserved after path switching.

In examples, the method may include sending a message to an application. For example, the message may indicate the IP address of the first WTRU for communication via the Uu-based network communication link network.

In examples, the method may include sending the path switching request to the second WTRU via the PC5 communication link. In examples, the method may include receiving the path switching response from the second WTRU via the PC5 communication link. In examples, the method may include sending a path switch acknowledgement to the second WTRU via the PC5 communication link.

In examples, a first WTRU may be configured to perform a policy and parameter provisioning procedure. In examples, a first WTRU may be configured to perform a PC5 unicast connection establishment with a second WTRU based on the policy and/or parameter provisioning procedure. For example, the PC5 unicast connection may include a set of one or more PC5 Quality of Service (QoS) flows that may be associated with a list of allowed QoSs for PC5 QoS flows for the ProSe service. In examples, a first WTRU may be configured to determine to perform path switching with the second WTRU. In examples, the first WTRU may be configured to send a message to a network node. For example, the message may include a Protocol Data Unit (PDU) session establishment request to establish a network-based PDU session based on, for example, performing the PC5 unicast connection establishment. In examples, the first WTRU may be configured to receive a PDU session establishment response from the network.

In examples, a WTRU may be configured to determine whether a QoS flow can be switched between PC5 and Uu based on, for example, a verification of compatible User Plane (UP) security level between PC5 and Uu.

In examples, a first WTRU may be configured to exchange a traffic for an application using the established PC5 unicast link. In examples, a first WTRU may be configured to cancel the path switch with the second WTRU based on one or more of the following. A first WTRU may be configured to cancel the path switch with the second WTRU based on a determination that the PDU session establishment with the second WTRU has failed. In examples, a first WTRU may be configured to cancel the path switch with the second WTRU if the PDU session does not include QoS flows with the QoS level compatible to the QoS level of PC5 QOS flows for the application. In examples, a first WTRU may be configured to cancel the path switch with the second WTRU if the PDU session activated security level is not compatible with the required security level of the selected PC5 QoS flows.

DETAILED DESCRIPTION

Figure 1A:
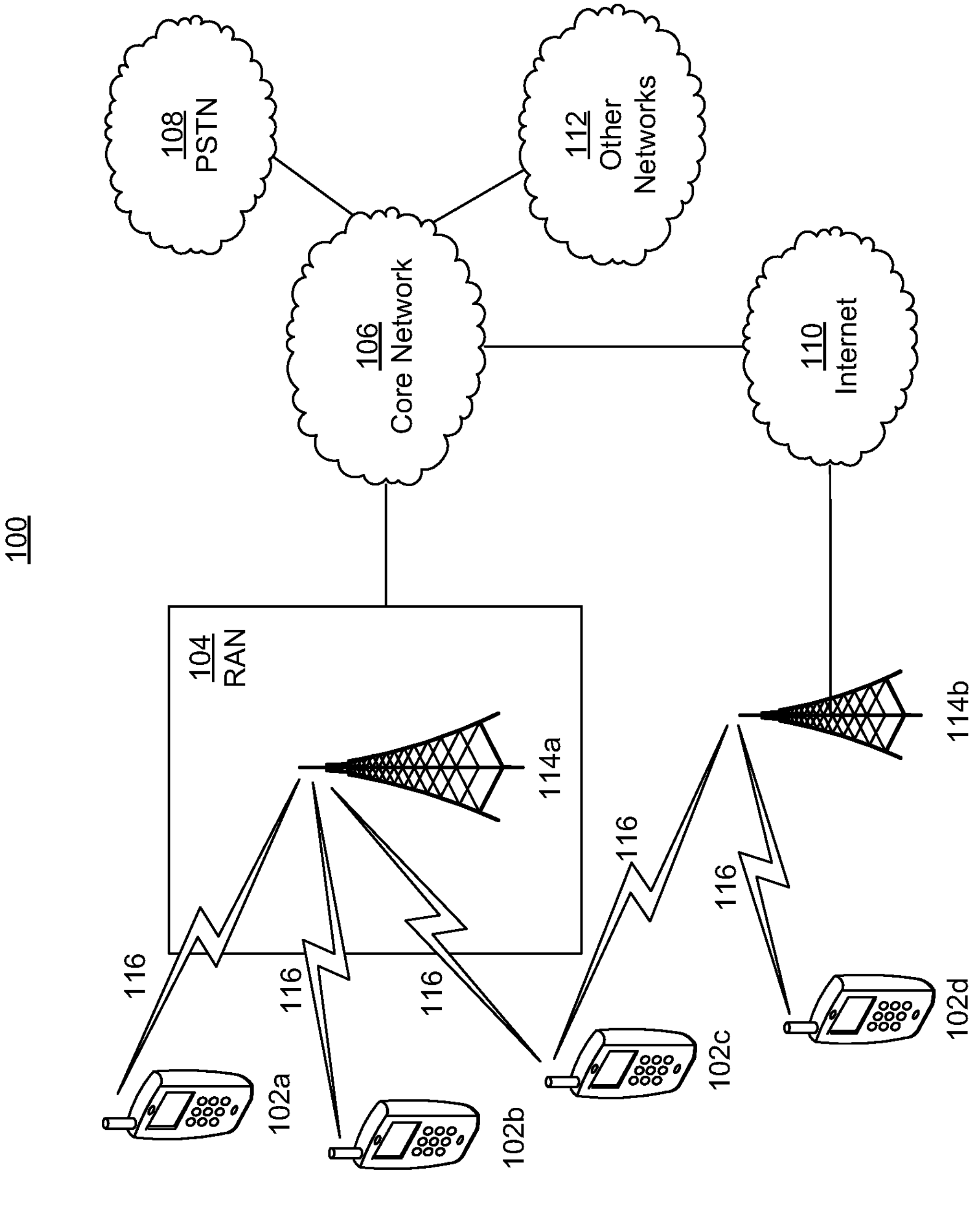
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
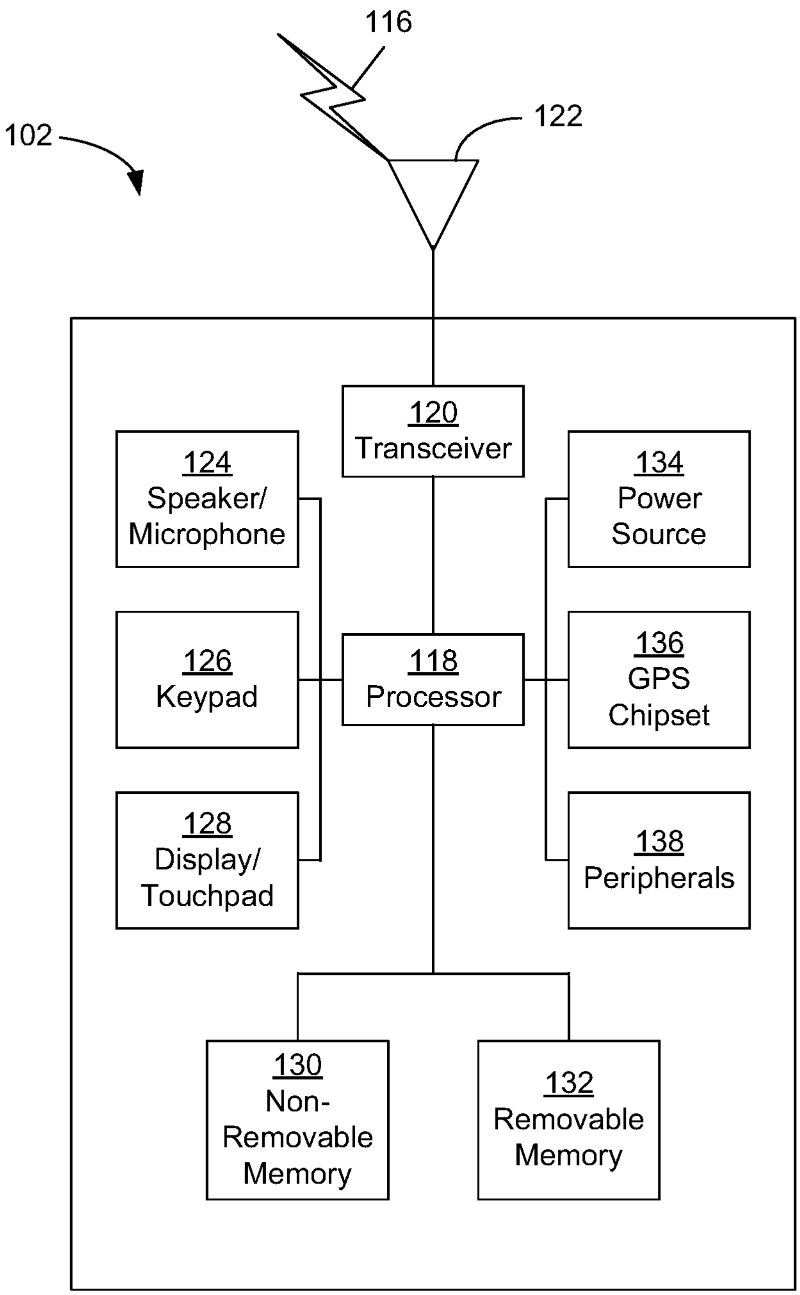
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
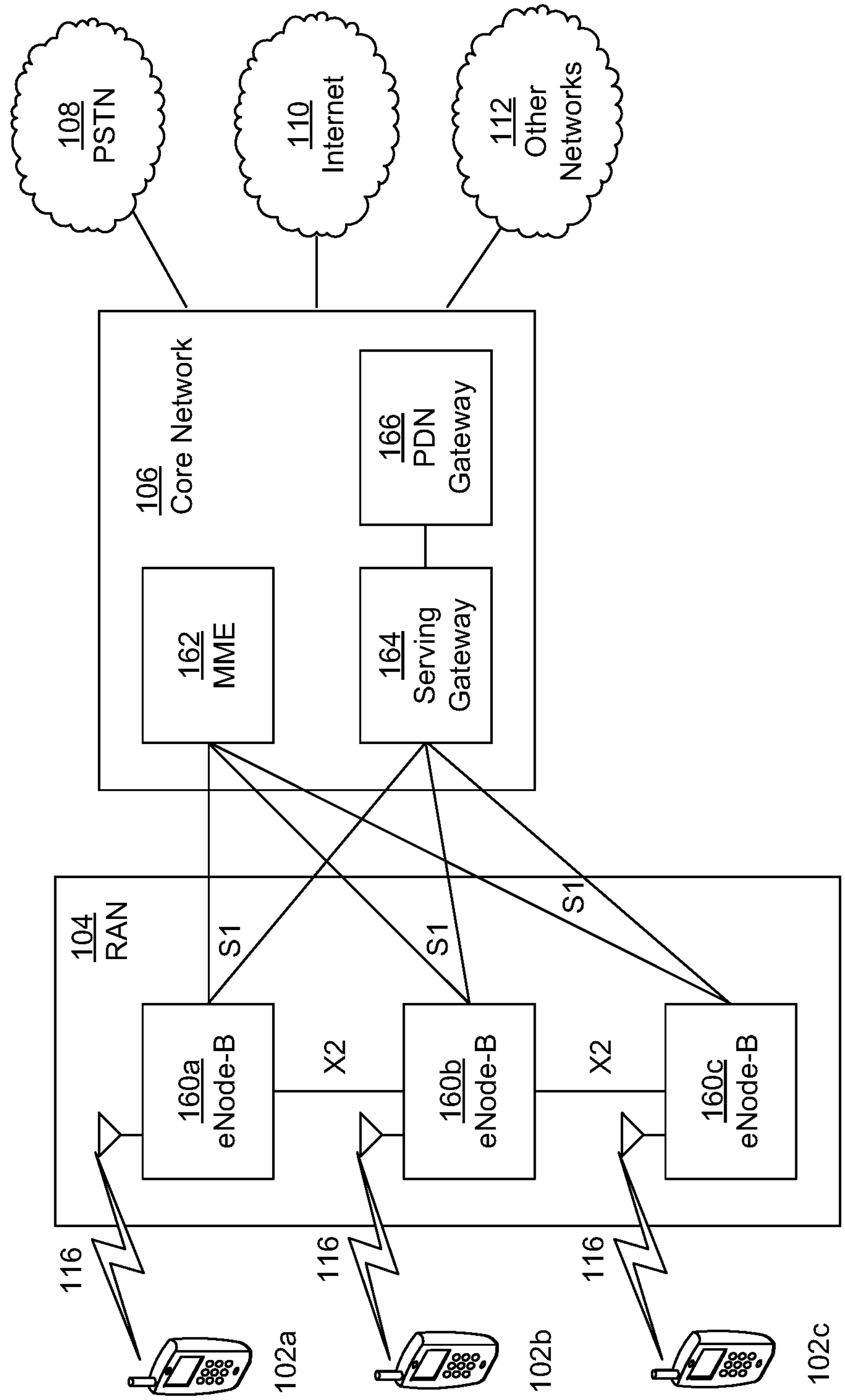
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHZ channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHz, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
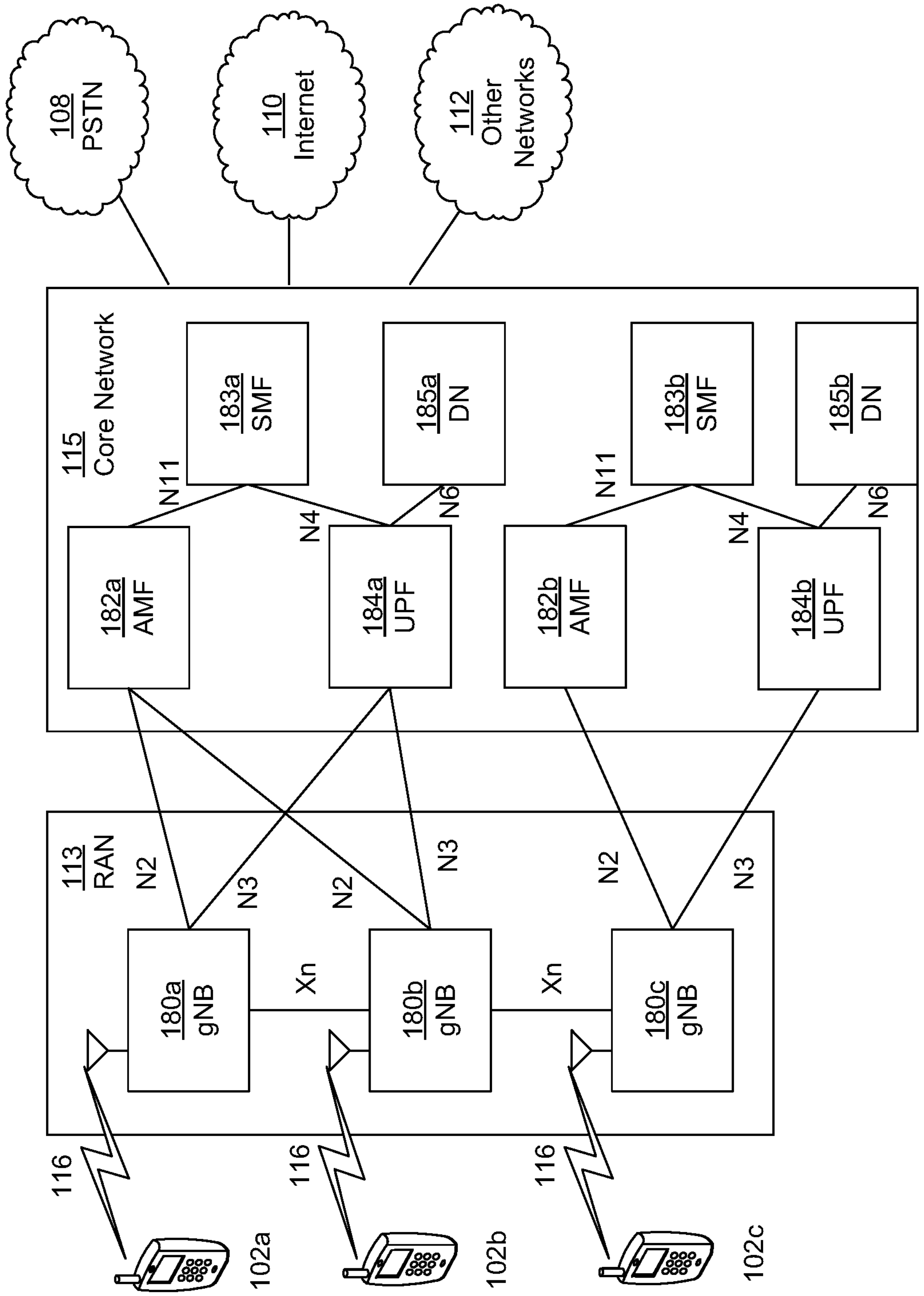
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, (e.g., or all) functions while being fully or partially implemented and/or deployed as part of a wired and/or wireless communication network in order to test other devices within the communication network. The one or more emulation devices may perform the one or more, (e.g., or all) functions while being temporarily implemented/deployed as part of a wired and/or wireless communication network. The emulation device may be directly coupled to another device for purposes of testing. The emulation device may perform testing using over-the-air wireless communications.

The one or more emulation devices may perform the one or more (e.g., including all) functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The phrase first WTRU may be used interchangeably with the acronym WTRU1 herein. The phrase second WTRU may be used interchangeably with the acronym WTRU2 herein.

Described herein are techniques to support path switching between a direct Uu interface and a direct PC5 interface, for example, in the non-relay case. For example, techniques for determining whether and/or how to support path switching between a direct NR Uu interface and a direct NR PC5 interface (e.g., in the non-relay case) may be described herein.

In order to allow a WTRU to implement path switching functionality, disclosed herein are techniques for allowing a WTRU to determine if and/or when traffic should be switched from the Uu to the PC5 (e.g., or vice-versa). For example, a WTRU may be configured to determine if the WTRU's peer WTRU(s) support path switching. When used herein, the term peer WTRU may be used to refer to other WTRUs that a given WTRU is in communication with. A WTRU may be configured to determine if the WTRU's peer WTRU(s) agree that a path switch should be performed. For instance, a WTRU may determine when to trigger a path switch based on one or more policies, observed criteria about the peer WTRU, information regarding the on-going communication session, radio link conditions, and/or the like. The WTRU may be configured to determine whether the peer WTRU is ready to implement a path switch prior to performing the path switch.

If the WTRU and/or the WTRU's peers support and/or agree to use path switching functionality, a WTRU may be configured to inform and/or otherwise indicate (e.g., via signaling) to its peers that path switching is to be performed. If the WTRU and/or the WTRU's peers support and/or agree to use path switching functionality, the WTRU may be configured to synchronize such path switching among the relevant peer WTRUs. The WTRUs may be configured to implement procedures associated with a change of IP address(es) when performing a path switch. A WTRU may be configured to utilize information about the pre-switch communication session in order to establish one or more parameters for communicating over the switched interface (e.g., QoS information, PDU session information, priority information, etc.).

The techniques described herein may address how and/or when a WTRU determines to trigger and/or perform path switching from a Uu interface to a PC5 interface. The techniques described herein may address how a WTRU determines that a peer WTRU is ready/able to perform a path switch. The techniques described herein may address how a WTRU informs peer WTRUs that path switching is to be performed. The techniques described herein may address how a WTRU is configured to handle the change of IP addresses associated with different communication paths. The techniques described herein may address how a WTRU determines that a peer WTRU supports and/or agrees to perform path switching. The techniques described herein may relate to how a WTRU is provided with the information to identify peers of the WTRU (e.g., in PC5 discovery procedure). The techniques described herein may relate to how a WTRU establishes a PDU session (e.g., with QoS flows having QoS levels corresponding to the QoS levels for the PC5 interface).

A WTRU may be configured (e.g., via configuration information) to determine whether to trigger path switching from NR Uu interface to NR PC5 interface (e.g., and/or vice versa). The WTRU may be configured to determine that one or more peer WTRUs are ready to switch communications paths. The WTRU may be configured to inform or otherwise indicate to its peer WTRU(s) that the WTRU has determined to perform path switching (e.g., based on a path switching policy, receiving an application trigger, and/or receiving a network trigger). The WTRU may be configured to handle changes in the IP addresses associated to the different paths. The WTRU may be configured to determine that the peers of the WTRU support and/or agree to use path switching.

One or more techniques to enable a WTRU to perform path switching from a PC5 interface (e.g., an NR PC5 interface) to a Uu interface (e.g., an NR Uu interface), and vice-versa, may be described herein. Although example techniques may be described with respect to a 5G/NR communication system, the techniques may be applicable to other types of communication systems. And although certain techniques are described herein with respect to ProSe layer technology, it may be understood that other application specific layer technologies may also, or alternatively, be used (e.g., V2X).

A WTRU may be configured (e.g., via configuration information) with path switching capability and path switching policies. For example, the path switching policies may indicate whether path switching for the WTRU has been enabled/disabled, a preferred interface (e.g., PC5 or Uu), certain thresholds and/or parameters to enable path switching (e.g., indicating radio and/or network configurations that may be used to determine whether to perform path switching).

A WTRU may indicate its capability to support path switching to the network and/or its peer WTRUs. For example, the WTRU may indicate its capability to support path switching during the PC5 discovery, PC5 link establishment, and/or initial network registration.

WTRUs may agree on the path switching usage, for example, during the PC5 link establishment. The path switching usage and policies (e.g., including interface preference and/or link quality thresholds) may also be negotiated during this procedure.

A WTRU may be configured (e.g., via configuration information) to perform path switching based on a path switching policy. For example, the WTRU may receive a trigger (e.g., via signaling) that is configured to cause the WTRU to perform path switching. The WTRU may also or alternatively be configured to determine to perform path switching based on a policy. For example, the policy may be a preferred interface driven policy, a link quality driven policy, and/or an application driven policy. The policy may also or alternatively be network controlled.

If, for example, the policy is preferred interface driven, a preferred interface for the given application may be configured as the Uu interface and/or the PC5 interface.

One or more of the following may apply if the policy is link quality driven. The WTRU may be configured with a link quality threshold. The WTRU may be configured to monitor the link quality. The WTRU may be configured to trigger communication path switching if the threshold is met (e.g., the link quality of the interface is below the threshold).

One or more of the following may apply if the policy is an application driven. The WTRU may receive an application layer trigger. For example, the trigger may be configured to cause the ProSe layer to switch from a Uu interface to a direct PC5 connection (e.g., or vice-versa). The WTRU may receive an application layer trigger from the ProSe App Server. For example, the application layer trigger received from the ProSe App server may include an explicit trigger and/or additional or updated service parameters (e.g., QoS requirements, service requirements, etc.). The application layer may trigger path switching based on this information, which may, for example, be received over a PC1 interface.

One or more of the following may apply if the path switching policy is network controlled. A WTRU may be triggered to switch from a Uu interface to direct PC5 connection (e.g., or vice-versa) by the network. For example, the network may trigger the WTRU to switch from Uu communication to direct PC5 connection (e.g., or vice-versa) based on certain criteria, such as, network congestion, an anticipated drop in link quality, and/or predictive QoS.

A WTRU may initiate path switching, for example, by using a new PC5 path switching procedure and/or during PC5 link establishment.

In certain scenarios, a WTRU may be aware of certain information related to a peer WTRU's Uu communication path, which may be used to trigger path switching. For example, a WTRU may be aware that: a peer of the WTRU has an established PDU session; that the peer of the WTRU does not have an established PDU session; that the peer of the WTRU does not have an established PDU session and/or has the ability to establish a PDU session; and/or that the peer of the WTRU does not have an established PDU session but cannot establish a PDU session. Peer WTRUs exchange information related to Uu path (e.g., PDU session established, PDU session released, a PDU session can be established, a PDU session cannot be established, etc.) with each other. The information related to the Uu path may be saved locally (e.g., at the WTRU). The information related to the Uu path may be considered by a WTRU to determine whether to trigger path switching.

The PC5 keepalive procedure and/or an additional PC5 request/response message procedure may also or alternatively be used to exchange and/or query that information related to Uu path across peer WTRUs. A keepalive procedure may be triggered, for example, whenever additional or updated information is to be exchanged across peer WTRUs. A WTRU may inform a peer WTRU about the existence of a PDU session existence, if, for example, the PDU session meets certain criteria (e.g., meets the QoS requirements) for the given application (e.g., the application running on the PC5 interface).

A WTRU may also, or alternatively, be configured to inform its peer WTRUs when the WTRU can (e.g., or cannot) establish a PDU session (e.g., considering mobility events, allowed slices, etc.). For example, a WTRU may be located in an area where the WTRU's service is restricted and/or otherwise not allowed (e.g., due to: single network slice selection assistance information (S-NSSAI) not being supported in the WTRU's current routing area, radio access technology (RAT) restrictions, service area restrictions, and/or service interruptions, for example, due to disaster conditions). If, for example, a WTRU is located in an area where the WTRU's service is restricted and/or otherwise unavailable, the WTRU may be configured to transmit a PDU session status indication to peer WTRUs. For example, the PDU session status may inform peer WTRUs of a given WTRU whether the given WTRU is able and/or allowed to establish a PDU session (e.g., based on its service access context/status). This exchange of information across peer WTRUs may be agreed during PC5 link establishment and/or saved locally at each of the peer WTRUs. Having this information locally saved on each of the peer WTRUs may enable path switching decisions to occur more quickly. For example, if the path switching policy indicates that PC5 is the preferred interface and/or peer WTRUs are not traveling in the same direction, the PC5 link quality may decrease. However, if certain information is shared across the peer WTRUs (e.g., that a given peer WTRU already has a PDU session established), the communication path may be switched to Uu interface prior to a link loss on the PC5 interface.

If the peer WTRUs know that a peer WTRU already has a PDU session established and/or can establish a PDU session, a path switching procedure may be triggered (e.g., immediately triggered) across the peer WTRUs. As another example, if the path switching policy indicates that Uu is the preferred interface and/or a given WTRU is currently out of network coverage (e.g., WTRUs that are currently out of network coverage may communicate using the PC5 interface) and/or if the WTRU knows that its peer WTRU has a PDU session established and/or can establish a PDU session, the WTRU may trigger path switching to the Uu interface, for example, as soon as the WTRU gets into network coverage and/or a PDU session is established.

Once a WTRU establishes a PDU session, the IP address associated with the session, which is known at the NAS layer, may also be made available to the application layer. The application layer may pass the IP address associated with the PDU session to the ProSe layer. For example, the ProSe layer may use the IP address associated with the PDU session during a path switching procedure.

The WTRU may be configured to exchange information across layers to enable path switching. For example, the ProSe layer may query the application layer to obtain information related to an existing PDU session (e.g., IP addresses, link quality, etc.). The ProSe layer may query the application layer to obtain the IP address associated with the PDU session during the path switching procedure. As described herein, information related to the link quality may also be queried and/or considered to enable path switching.

As described herein, a WTRU may be configured to switch from a Uu interface to a PC5 interface. In examples, peer WTRUs may be configured to discover each other over the PC5 interface and/or establish a PC5 unicast link. For example, peer WTRUs may be configured to establish a PC5 unicast link prior to initiating path switching. As described herein, peer WTRUs may also be configured to agree on the usage of certain policies related to path switching, for example, during a PC5 link establishment procedure.

In examples, peer WTRUs may already have a PC5 unicast link established. A PC5 link modification and/or a path switching procedure may be used to negotiate path switching usage and/or policy (ies) (e.g., if path switching is not already enabled on the PC5 link), as described herein.

A WTRU may be configured to switch from a PC5 interface to a Uu interface. In examples, peer WTRUs may be configured to communicate via a PC5 link. The peer WTRUs may have also agreed to enable path switching functionality and/or on the use of certain mechanisms to exchange information. For example, the peer WTRUs may have agreed to use the keepalive mechanism to exchange information about PDU session existence.

A WTRU may be configured to determine (e.g., based on preferred interface or link quality) to switch from a PC5 interface to a Uu interface over a PDU session.

One or more of the following may apply if a WTRU determines to switch from a PC5 interface to a Uu interface, for example, based on a preferred interface. The WTRU may establish and/or may be able to establish a PDU session that meets a given application's requirements (e.g., QoS). The WTRU may further be configured with a preferred interface for the given application. For example, the preferred interface for the application may be set to Uu. The WTRU may determine that a PDU session exists and/or can be established on its peer WTRU (e.g., using the keepalive mechanism).

One or more of the following may apply if a WTRU determines to switch from a PC5 interface to a Uu interface, for example, based on a link quality. The WTRU may be configured with a link quality threshold, and/or the WTRU may determine that the PC5 link quality is decreasing (e.g., the PC5 link quality is below the threshold). The WTRU may determine that a PDU session is already established and/or can be established on the WTRU and on a peer of the WTRU. As described herein, the WTRU may determine that a PDU session is already established on a peer of the WTRU based on the keepalive mechanism.

Also, or alternatively, the WTRU may be configured to receive a trigger (e.g., by a given application and/or the network) that causes the WTRU to switch from a PC5 interface to a Uu interface over a PDU session.

One or more of the following may apply if a WTRU received an application trigger that causes the WTRU to switch from a PC5 interface to a Uu interface. The WTRU may receive an application layer trigger that is configured to cause the ProSe layer to switch from a direct PC5 connection to a Uu connection. For example, the application layer trigger may be received based on new service parameters. The application layer trigger may also or alternatively include an explicit trigger that is received from the application server.

As described herein, a WTRU may receive a network trigger that causes the WTRU to switch from a PC5 interface to a Uu interface. For example, the WTRU may receive a network trigger that causes the WTRU to switch from a PC5 interface to a Uu interface based on the WTRU's mobility settings, the switching duration, and/or network conditions.

As described herein, a WTRU may be configured to determine if a peer of the WTRU has an established PDU session that is suitable for an application running on the PC5 link. The WTRU may determine that a peer has an already establish PDU session via an exchange of information using, for example, the keepalive mechanism. For example, when a PDU session is established (e.g., or released), a given WTRU is configured to notify the WTRU's peers by triggering the keepalive procedure and/or including PDU session status. Other PC5 messages/procedure (e.g., a new info sharing procedure and/or link modification procedure) may also, or alternatively, be used to notify peer WTRUs about PDU session establishment and/or release.

Figure 2:
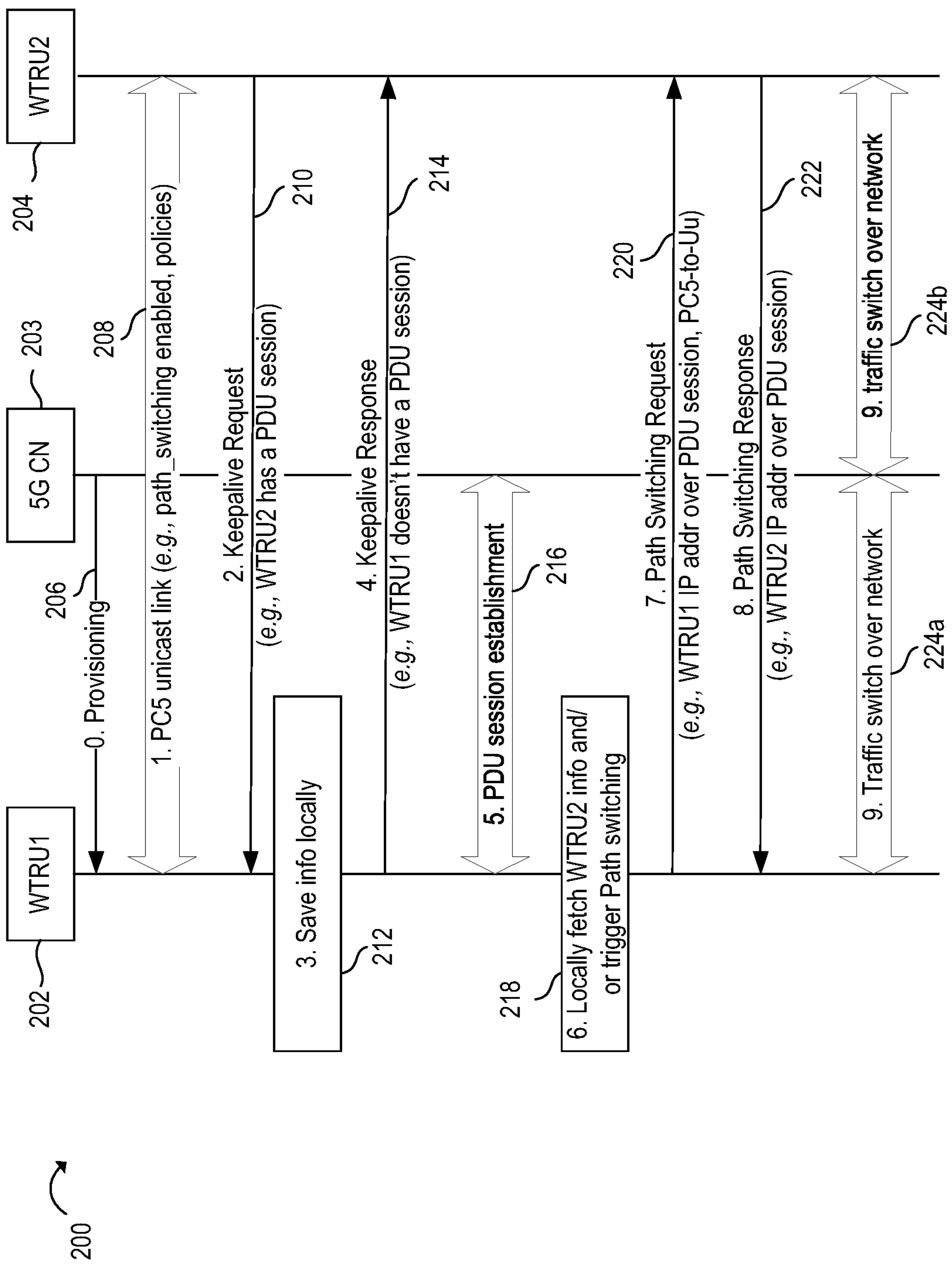
FIG. 2 illustrates an example path switching procedure from direct PC5 interface to direct Uu interface implemented by a WTRU.

FIG. 2 illustrates an example path switching procedure 200 implemented by a WTRU. As shown in FIG. 2, the network 203 (e.g., 5G Core Network (CN)) may send a message at 206 to the WTRU1 202. The message 206 may indicate to provision the WTRU1 202. For example, the WTRU1 202 may be provisioned (e.g., via configuration information) with path switching capability (e.g., enabled/disabled), path switching policies (e.g., preferred interface, link quality thresholds, as described herein), and/or an information sharing method (e.g., keepalive procedure). Referring to the example illustrated in FIG. 2, the WTRU1 202 may move outside of network coverage, for example, after provisioning.

At 208, a PC5 link (e.g., PC5 unicast link) may be established between WTRU1 202 and WTRU2 204. Certain path switching parameters (e.g., path switching enabled/disabled, policies, info sharing method) may be specified during the PC5 link setup. For example, the path switching parameters may be specified using the Direct Communication Request (DCR) and/or Direct Security Mode (DSM) Command messages, and/or via DSM Complete and Direct Communication Accept (DCA) messages (e.g., if the path switching parameters need to be protected). The path switching capability of the PC5 link may be an attribute of the PC5 link. If a new QoS flow and/or another service is added to the link, the WTRU1 202 and/or the WTRU2 204 may determine to establish a new PC5 link, and/or reuse an existing PC5 link, for example, if the new service meets the path switching requirement (e.g., the additional service supports a path switch). In examples, there may be certain services that do not prefer path switching. If a PC5 link with a path switching attribute is already established and/or another service that does not prefer path switching is added, the WTRU (e.g., WTRU1 202) may be configured to establish a new PC5 link with the same WTRU (e.g., WTRU2 204).

Peer WTRUs may be configured to share information associated with existing PDU sessions with each other. As illustrated in FIG. 2, the WTRU2 204 may be configured to inform the WTRU1 202 about its existing PDU session, for example, by using the PC5 keepalive mechanism. For example, the WTRU2 204 may be configured to transmit a PC5 keepalive request message 210. The PC5 keepalive request message may include the WTRU2's 204 PDU session status (e.g., available). Similarly, both the WTRU1 202 and/or the WTRU2 204 may make sure that their respective peer WTRUs are updated with the latest PDU session status using the keepalive mechanism.

In examples, the WTRU1 202 may be configured to keep track of (e.g., maintain) the WTRU2's 204 PDU session existence/status, for example, based on the keepalive request messages received from the WTRU2 204. At 212, the WTRU1 202 may save the information locally.

In response to the keepalive request message 210 received from the WTRU2 204, the WTRU1 202 may transmit a keepalive response message 214. The keepalive response message 214 may include the WTRU1's PDU session status. For example, as illustrated in FIG. 2, the WTRU1 202 may transmit the keepalive response message 214 to the WTRU2 204 that indicates that WTRU1 202 does not have any established PDU session.

At 216, the WTRU1 202 may establish a PDU session with the network 203, for example, after the WTRU1 202 enters into network coverage. The WTRU1 202 may retrieve information related to the WTRU2 204 from the memory of the WTRU1 202, where the information indicates a status of PDU session (e.g., via PC5 communication link). Although not shown in FIG. 2, the WTRU1 202 may update the WTRU2 204 with its PDU session existence using, for example, the keepalive mechanism described herein. Additionally or alternatively, the WTRU1 202 may initiate a path switching procedure.

At 218, the WTRU1 202 may retrieve certain information related to the WTRU2 204 (e.g., PDU session existence), for example, from local storage, and/or determine whether the WTRU2 204 has an existing PDU session that is available for path switching. The WTRU1 202 may detect and/or receive a trigger that is configured to cause the WTRU1 202 to initiate path switching from a PC5 interface to a Uu interface. For example, a trigger that is configured to cause the WTRU1 202 to initiate path switching from a PC5 interface to a Uu interface may include one or more of the following: PDU session establishment at WTRU1 202 and/or WTRU2 204 (e.g., if the preferred path policy indicates Uu interface); lower link quality measurements over the PC5 link (e.g., the PC5 link quality is below a configured threshold); a network trigger; and/or an application layer trigger.

If the WTRU1 202 determines that the WTRU2 204 has an available PDU session, the WTRU1 202 may be configured to trigger path switching, for example, by transmitting a PC5 path switching request message 220 to WTRU2 204. The PC5 path switching request message may include the IP address used over WTRU1's PDU session and/or the path switching direction (e.g., PC5-to-Uu). As described herein, the WTRU1 202 may retrieve the IP address associated with its PDU session from the application layer. The PC5 path switching request message 220 (e.g., WTRU1 IP address over PDU session, PC5-to-Uu) transmitted by the WTRU1 202 may also specify if the PC5 link should be preserved, for example, after a successful path switch (e.g., as a backup link).

The WTRU2 204 may be configured to keep track of certain information related to WTRU1's 202 PDU session, including, for example, WTRU1's IP address over the PDU session and/or WTRU1 PDU session existence. If the WTRU2 204 is capable of performing a path switch, the WTRU2 204 may reply to WTRU1 202 by transmitting a PC5 path switching response message 222. For example, as shown in FIG. 2, the WTRU2's PC5 path switching response message 222 may include WTRU2's PDU session IP address (e.g., over the PDU session). The WTRU2 204 may determine that the WTRU1 is ready to switch traffic over the PDU session. For example, the WTRU2 204 may wait for the reception of traffic from WTRU1 202 over the PDU session (e.g., to ensure the PC5 path switching response message has been received by the WTRU1 202), and/or wait for the duration of a retransmission timer value that is associated with the path switching request message. If, however, the WTRU2 204 determines not to switch paths (e.g., because the PDU session has just been released), the WTRU2 204 may transmit a PC5 path switching reject message to the WTRU1 202. The PC5 path switching reject message may include the WTRU2's 204 reason for rejecting the path (e.g., indicating that the PDU session is released). If, for example, the WTRU1 202 receives a PC5 path switching reject message from the WTRU2 204, the WTRU1 202 may abort the path switching procedure.

After a successful path switch, at 224*a* and/or 224*b*, (e.g., a path switching response message is transmitted by the WTRU2 204 and received by WTRU1 202, as illustrated in FIG. 2 200), the WTRU1 202 and/or the WTRU2 204 may inform their application and/or their peer WTRUs about the successful path switch and/or their peer WTRU's IP address associated with PDU session. After a successful path switch, the WTRU1 202 and/or the WTRU2 204 may also be configured to transmit traffic over the PDU session and/or stop sending traffic over the PC5 link.

A PC5 unicast link may be preserved, for example, after a successful path switch to the Uu interface 224*a*, 224*b*. If the PC5 unicast link is intended to be preserved, an indication as to such (e.g., a "preserve link" indication) may be included in the PC5 path switch request/response messages 220, 222 (e.g., so that both WTRUs agree to keep the PC5 link). For example, keeping the PC5 unicast link alive may allow the WTRU to skip the PC5 discovery and/or PC5 link establishment procedures in the event that a path switch from the Uu interface to the PC5 interface is needed.

A WTRU may be configured to establish an on-demand PDU session. As described herein, a WTRU may determine whether its peer WTRU is able to establish a PDU session (e.g., is allowed to establish a PDU session) that is suitable for a given application (e.g., the application running on the PC5 link). For example, the WTRU may determine whether its peer WTRU is able to establish a PDU session (e.g., is allowed to establish a PDU session) via an exchange of information with the peer WTRU (e.g., using the keepalive mechanism). A WTRU may be configured to inform (e.g., immediately inform) its peer WTRU of whether the WTRU is able to establish a PDU session, for example, via the keepalive mechanism. The WTRU may also, or alternatively, be configured to inform its peer WTRU of any changes to the WTRU's ability to establish a PDU session. Further, although the information exchange between peer WTRUs about their respective PDU session status via PC5 link may be described using the keepalive mechanism, other messages/procedures (e.g., PC5 messages/procedures) may also, or alternatively, be used (e.g., additional information sharing procedures and/or link modification procedures).

Figure 3:
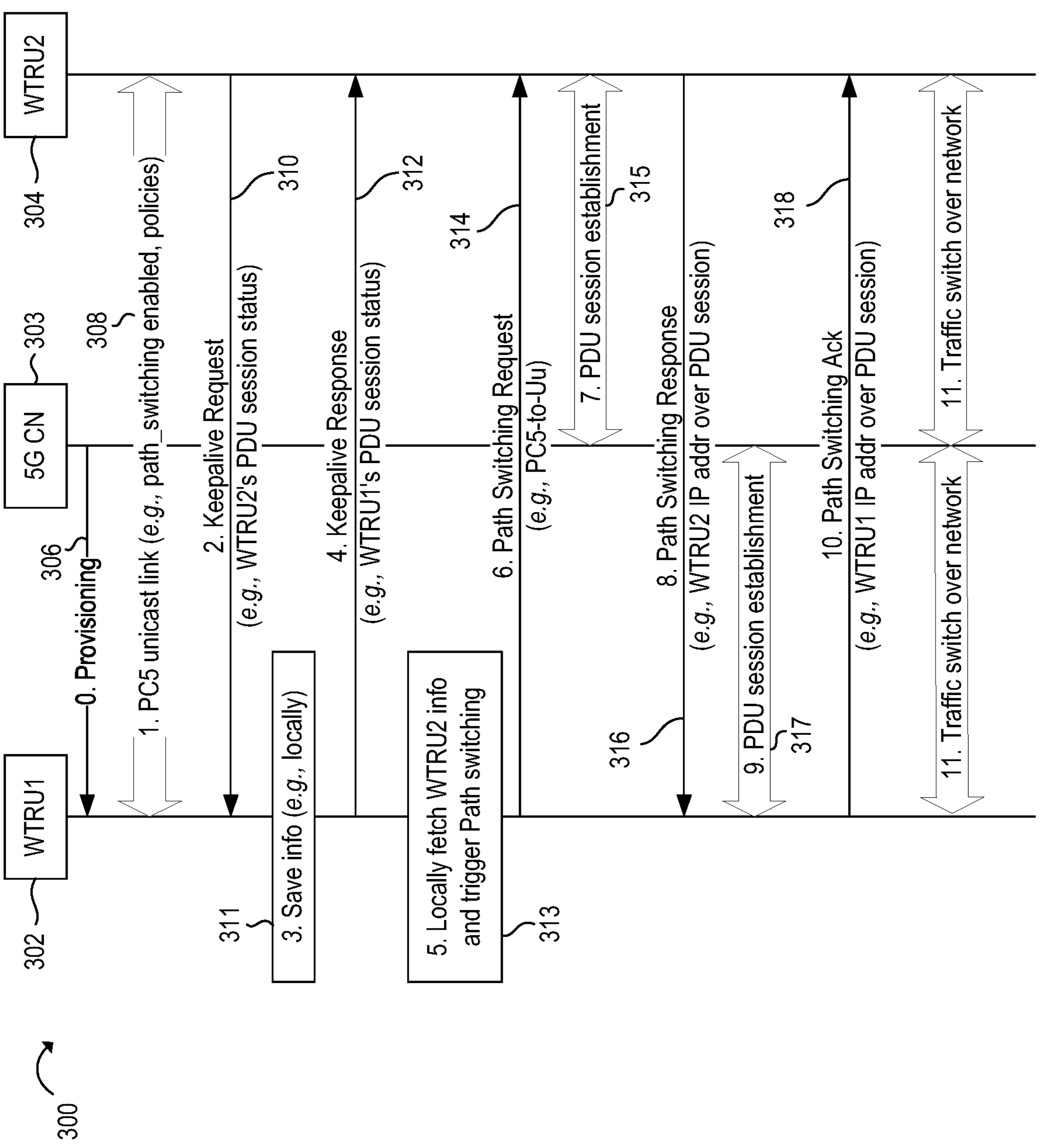
FIG. 3 illustrates an example associated with path switching where peer WTRUs have an established PC5 unicast link and on-demand PDU sessions establishment.

FIG. 3 illustrates an example procedure 300 associated with path switching where peer WTRUs have an established PC5 unicast link. A first WTRU 302 (e.g., a WTRU1 302) may be provisioned by the network (e.g. a 5G core network 303) at 306. At 308, for example, the first WTRU1 302 may negotiate path switching functionality and/or policy (ies) with a second WTRU (e.g., a WTRU 2 304), or vice versa. As illustrated in FIG. 3, peer WTRUs (e.g., the WTRU1 302 and/or the WTRU2 304) may be configured to exchange their respective PDU session status over the PC5 interface and/or, when requested and/or when needed and/or when possible, trigger path switching from the PC5 interface to the Uu interface. The WTRUs may determine to establish on-demand PDU sessions, e.g., when a path switching procedure is initiated. For example, a WTRU may initiate path switching if: the Uu interface is the preferred interface and/or both WTRUs are able to establish a PDU session; and/or the PC5 interface is the preferred interface and/or the link quality of a PC5 link decreases; etc.

As shown in FIG. 3, the network (e.g., 5G CN) 303 may provision the WTRU1 302 at 306. For example, the WTRU may be provisioned (e.g., via configuration information, with one or more parameter(s)) with path switching capability (e.g., enabled/disabled), path switching policies (e.g., preferred interface, link quality thresholds, as described herein), and/or an information sharing method (e.g., keepalive procedure). Referring to the example illustrated in FIG. 3, the WTRU1 302 may move outside of network coverage after provisioning.

A PC5 link may be established between the WTRU1 302 and the WTRU2 304. Certain path switching parameters (e.g., path switching enabled/disabled, policies, info sharing method) may be specified during the PC5 link setup. For example, the path switching parameters may be specified using the Direct Communication Request (DCR) and/or Direct Security Mode (DSM) Command messages, and/or via DSM Complete and/or Direct Communication Accept (DCA) messages (e.g., if the path switching parameters need to be protected). The path switching capability of the PC5 link may be an attribute of the PC5 link. If a new QoS flow and/or a new service is added to the link, the WTRU1 302 and/or the WTRU2 304 may determine to establish a new PC5 link, and/or reuse an existing PC5 link, for example, if the new service meets the path switching requirement (e.g., the new service supports a path switch). There may be certain services that do not prefer path switching. The WTRU (e.g., WTRU1 302) may establish a new PC5 link with the same WTRU (e.g., WTRU2 304), for example, if a PC5 link with a path switching attribute is already established and a service that does not prefer path switching is added.

Peer WTRUs may be configured to share information associated with their existing PDU sessions with each other. As illustrated in FIG. 3, the WTRU2 304 may be configured to inform the WTRU1 302 about the WTRU2's 304 ability to establish PDU session using the PC5 keepalive mechanism. For example, the WTRU2 304 may transmit a message at 310 to the WTRU1 302. The message may indicate a PC5 keepalive request message 310 that includes WTRU2's PDU session status (e.g., WTRU2 304 is able to establish a PDU session and/or the WTRU2 304 is able to perform a path switch from the PC5 communication link to the Uu-based network communication link). The message may be sent via a PC5 communication link. The WTRU1 302 and/or the WTRU2 304 may update their peer WTRU with their latest PDU session status. For example, a WTRU's PDU session status may indicate that: the WTRU is able to establish a PDU session; a PDU session is not currently established for the WTRU; the WTRU is not able to establish a PDU session; and/or a PDU session is established; etc.

If, for example, a WTRU2 304 is not able to establish a PDU session, the WTRU2 304 may, in addition to WTRU's PDU session status, inform the WTRU1 302 of the cause of/reason why the WTRU2 304 is not able to establish a PDU session. At 311, for example, the WTRU1 302 may save information (e.g., locally). The saved information may include the WTRU2's PDU session status, as transmitted from the WTRU2 304 to the WTRU1 302 (e.g., via the Keepalive Request 310). The WTRU1 302 may keep track of peer WTRU's capability to establish a PDU session. In examples, the WTRU1 302 and WTRU2 304 may exchange their capability (ies) to establish a PDU session or not (e.g., mobility restriction).

As illustrated in FIG. 3, the WTRU1 302 may be configured to maintain and/or keep track of the WTRU2's PDU session status (e.g., that WTRU2 can establish a PDU session). The WTRU1 302 may respond to the keepalive request message received from the WTRU2 304, for example, by transmitting a keepalive response message 312. The keepalive response message 312 may include the WTRU1's PDU session status (e.g., the WTRU1 302 is not able to establish a PDU session). If, for example, the WTRU1 302 is not able to establish a PDU session, the keepalive response message 312 may also, or alternatively, include the cause of/reason why the WTRU1 302 is not able to establish a PDU session. At 313, for example, the WTRU1 302 may fetch (e.g., locally fetch) the WTRU2 304 information and/or trigger Path switching. The WTRU1 302 may consider the WTRU2 304 capability (ies) to establish a PDU session (e.g., prior to trigger path switching).

The WTRU1 302 may be able to establish a PDU session (e.g., WTRU1 302 moves into network coverage and/or to an area where WTRU1 302 is allowed to establish a PDU Session). The WTRU1 302 may determine whether a condition to trigger path switching is met (e.g., a low link quality is measured on the PC5 link, WTRU1's path switching policies indicate that the Uu interface is preferred, a trigger from the application layer has been received, etc.). The WTRU1 302 may retrieve certain information related to WTRU2 304 (e.g., WTRU2's PDU session status) and/or determine whether the WTRU2 304 is able to switch the communication from the PC5 interface to the Uu interface.

Although not shown in FIG. 3, the WTRU1 302 may update the WTRU2 304 with the WTRU1's 302 updated PDU session status, e.g., by transmitting a keepalive request message 310. For example, the keepalive request message 310 transmitted by the WTRU1 302 may inform the WTRU2 304 that the WTRU1 302 is ready for path switching and/or to confirm that the locally stored PDU session status is accurate. In turn, the WTRU2 304 may transmit a keepalive response message 312 to the WTRU1 302, which may indicate that the WTRU2 304 is ready for path switching and/or to confirm that the locally stored PDU session status is accurate.

If the WTRU1 302 determines that the WTRU2 304 is able to accept path switching (e.g., via the keepalive mechanism, as described herein), the WTRU1 302 may initiate a path switch by transmitting a PC5 path switching request message 314 to the WTRU2 304. Additionally or alternatively, the WTRU1 302 may send a path switch request message 314 to the WTRU2 304 based on a determination that one or more triggers have occurred and/or that the WTRU2 304 is able to perform path switching. For example, the PC5 path switching request message 314 may include an indication of the path switching direction (e.g., PC5-to-Uu). The path switching request message 314 may be sent to the WTRU2 304 via the PC5 communication link. The path switching request message 314 may include that path switching is triggered over PC5 interface. The WTRU1 302 may also, or alternatively, specify if the PC5 link should be preserved after a successful path switch to the UU interface, e.g., as a backup link. If, for example, the WTRU1 302 already has an established PDU session that may be used for path switching, the PC5 path switching request message 314 may include the IP address associated with WTRU1's 302 established PDU session.

As illustrated in FIG. 3, the WTRU2 304 may establish a PDU session (e.g., at 315) if a PDU session is not established. The WTRU2 304 may also, or alternatively, modify an existing PDU session (e.g., adjust the QoS).

The WTRU2 304 may respond to WTRU1's PC5 path switching request message 314. For example, the WTRU2 304 may respond to a path switching request message 314 by transmitting a PC5 path switching response message 316. The PC5 path switching response message 316 may include the IP address associated with WTRU2's PDU session. The WTRU1 302 may receive the path switch response from a WTRU2 304 via the PC5 communication link. If, however, the WTRU2 304 is no longer able to establish a PDU session and/or perform path switching and/or if WTRU2's PDU session establishment failed, the WTRU2 304 may transmit a PC5 path switching reject message. If a PC5 path switching reject message is transmitted, the path switching procedure (e.g., an initiated path switching procedure) may be aborted. After a path switching procedure is aborted, a retry timer may be started. Upon expiration of the retry timer, a path switching procedure may be initiated (e.g., reinitiated). For example, after expiration of the retry timer and/or if both WTRUs have a PDU session established and/or are able to establish a PDU session and/or a condition to initiate path switching from the PC5 interface to the Uu interface is met (e.g., policy driven path switching, link quality driven path switching, and/or application layer driven path switching) a path switching procedure may be reinitiated.

As shown in FIG. 3, the WTRU1 302 may maintain or keep track of WTRU2's IP address over a given PDU session. At 317, the WTRU1 302 may also establish a PDU session and/or modify an existing PDU session (e.g., with a network node to establish a network-based PDU session based on receiving the path switch response).

The WTRU1 302 may transmit a PC5 path switching acknowledgment message 318 to the WTRU2 304. For example, the PC5 path switching acknowledgment message 318 transmitted by the WTRU1 302 may include the IP address associated to WTRU1's 302 PDU session. The WTRU2 304 may receive the path switch acknowledgement message 318 that may be sent from the WTRU1 302 via the PC5 communication link. The WTRU1 302 may switch traffic to the established PDU session, for example after transmitting the PC5 path switching acknowledgment message 318. The WTRU2 304 may maintain and/or keep track of the IP address associated with WTRU1's PDU session. In examples (e.g., alternatively to transmitting a PC5 path switching acknowledgement), the WTRU1 302 may transmit a PC5 path switching abort message to abort a path switching procedure, e.g., if the PDU session establishment failed. In examples, if the WTRU1 302 already had an established PDU session and/or if the WTRU1 302 provided the IP address associated with the PDU session in the PC5 path switching request message, the WTRU1 302 may not transmit a PC5 path switching acknowledgment message 318.

The WTRU1 302 and/or the WTRU2 304 may notify their respective applications about a successful path switch. Additionally or alternatively, the WTRU1 302 and/or the WTRU2 304 may notify their respective applications of the IP address of their peer WTRUs' PDU sessions. The WTRU1 302 and/or the WTRU2 304 may switch traffic from the PC5 link to the established PDU session.

As described herein, the network 303 may control and/or provide assistance for PC5 to Uu switching. One or more of the following may apply. In examples, the WTRUs may be on the move and/or reporting their locations periodically and/or occasionally (e.g., via tracking area (TA) updates in case of Uu, and/or reporting to Direct Discovery Name Management Function (DDNMF) in case of PC5). If the WTRUs move too far away from each other and/or beyond a visual line-of-sight (e.g., beyond the typical PC5 range), the WTRUs' PC5 connection may not be functional.

In examples, the WTRUs may be located close enough within the same cell, but, for example, the PC5 functionality may be limited (e.g., due to blockages) terrain, vertical movement (e.g., within a tall building), etc. In examples, the WTRUs may switch from the Uu interface to the PC5 for a fixed duration, and/or, after that fixed duration, the network may trigger the WTRU to switch back to the Uu interface. In examples, certain network functions, such as an access and mobility management function (AMF), a session management function (SMF), a user plane function (UPF), DDNMF, and/or certain application functions for certain application-based triggers, may report and/or subscribe to the analytics function in the network, e.g., NWDAF. For example, the analytics function in the network may perform the analytics and/or provide the relevant information to the appropriate network function to trigger a path switch.

In certain scenarios, peer WTRUs may have a direct PC5 connection with each other, while the WTRUs have active PDU sessions with the network (e.g., within a single public land mobile network (PLMN), or with different PLMNs in case both WTRUs do not belong to the same PLMN). In examples, the network may trigger the WTRU to perform path switching and/or provide the relevant WTRUs with the information related to each other's PDU sessions, for example upon a valid condition (e.g., as discussed above).

A path switching assistance function (PSAF) may provide a network path assistance. The PSAF may be co-located with an existing network function (e.g., DDNMF, SMF and/or ProSe AS), as illustrated herein.

Figure 4:
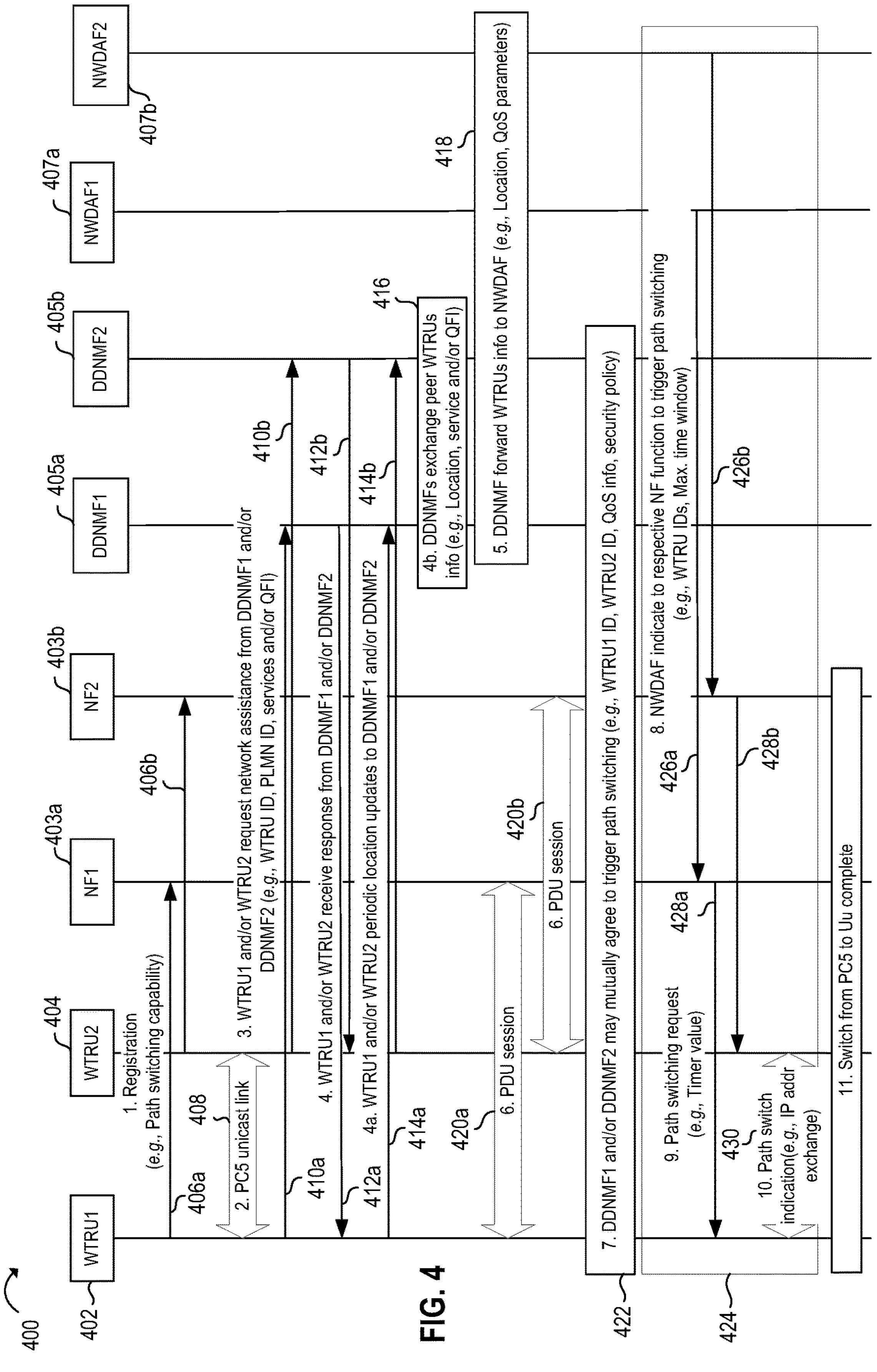
FIG. 4 illustrates an example procedure associated with network triggered path switching from direct PC5 interface to direct Uu interface.

FIG. 4 illustrates an example procedure 400 associated with network triggered path switching. One or more of the following may apply. During initial registration 406*a* 406*b*, the WTRU1 402 and/or the WTRU2 404 may provide their respective path switching capabilities to the network, as illustrated in FIG. 4. For example, the WTRU1 402 and/or the WTRU2 404 may indicate their ability to switch from a PC5 interface to a Uu interface (e.g., or vice versa) based on a network trigger. As also shown, the WTRU1 402 and/or the WTRU2 404 may have ongoing PC5 unicast link (e.g., at 408). The PC5 unicast link may be based on the policy and/or parameter provisioning procedure. The PC5 unicast connection may include a set of one or more PC5 Quality of Service (QOS) flows that may be associated with a list of allowed QoSs for PC5 QoS flows for the ProSe service.

One or more (e.g., each) WTRUs (e.g., WTRU1 402 and/or WTRU2 404) may be configured to transmit a request message to its respective PSAF 410*a* 410*b* (e.g., DDNMF, SMF). For example, the request message 410*a* and/or 410*b* may include a request for network path switching assistance. The request message (e.g., 410*a* and/or 410*b*) may also provide information associated with the requesting WTRUs, such as the respective WTRU IDs (e.g., ProSe ID, Layer2 ID, IP address etc.) the serving PLMN ID, and/or the PC5 and/or Uu link information. For example, the PC5 and/or Uu link information may indicate whether the PC5 interface and/or Uu link is currently active or inactive, indication of service(s) and/or QoS flow indicators (QFIs) in use for a given interface, and/or IP address associated with a given interface, and/or the like.

Based on the request received WTRU1 and WTRU2, the DDNMF (e.g., DDNMF1 405*a* and/or DDNMF2 405*b*) may perform one or more of the following: verify authorization for path switching assistance based on the WTRUs' subscription information and local policy (e.g., with a policy control function (PCF) for service QoS requirements); query the network (e.g., via a network exposure function (NEF)) to obtain information about the WTRUs' Uu link information (e.g., session parameters, QoS information about the link, WTRU location, etc.); subscribe for the WTRUs' mobility event notifications with AMF (e.g., based on location reports from RAN), which may be used in the path switching decision; contact other PLMN's DDNMF for path switching assistance setup and activation; and/or subscribe for data analytics with an NWDAF (e.g., NWDAF1 407*a* and/or NWDAF2 407*b*) and with a PCF (e.g., for policy enforcement, which may be used in the path switching decision). Upon receiving the request from the DDNMF/ProSe AS, the NEF may query different network nodes, e.g., AMF, PCF, SMF, possibly together with NWDAF (e.g., NWDAF1 407*a* and/or NWDAF2 407*b*), to obtain the corresponding information and/or send the corresponding information to the DDNMF (e.g., DDNMF1 405*a* and/or DDNMF2 405*b*) and/or ProSe AS.

As illustrated in FIG. 4, the WTRU1 402 and/or WTRU2 404 may each receive a response message 412*a* and/or 412*b*. For example, the response message(s) (e.g., 412*a* and/or 412*b*) may acknowledge that network path switching assistance is enabled/accepted. Following the activation/enablement of network path switching assistance, one or more of the following may apply: the WTRU1 402 and/or the WTRU2 404 may be configured to periodically report their location and QoS parameters (e.g., at 414*a* and/or 414*b*) to DDNMF1 405*a*, and/or DDNMF2 405*b*, respectively; and/or DDNMF1 405*a* and DDNMF2 405*b* may exchange location and QoS information for peer WTRUs (e.g., at 416).

As illustrated in FIG. 4, DDNMF/ProSe AS may forward the information received from the WTRUs (e.g., WTRUs' location and QoS parameters) to the respective NWDAF at 418. For example, the NWDAF (e.g., NWDAF1 407*a* and/or NWDAF2 407*b*) may perform analytics on the information received from the WTRUs, which may then be used to trigger path switching. Additionally or alternatively, the AMF may transmit WTRU mobility information, including, for example, tracking area, timestamps for when the location is reported, etc to the NWDAF (e.g., NWDAF1 407*a* and/or NWDAF2 407*b*). The DDNMF (e.g., DDNMF1 405*a* and/or DDNMF2 405*b*) and/or the AMF may also, or alternatively, forward the WTRU mobility information to an application server in the data network, which may, for example, be used to enable an application-level trigger for path switching.

In certain scenarios, the WTRU1 402 and/or the WTRU2 404 may already have a respective PDU session (e.g., at 420*a* and/or at 420*b*) established after communication with DDNMF, as illustrated in FIG. 4. But if the WTRUs determine that the existing PDU session is not suitable after the path switch (e.g., not suitable for the desired service), the WTRU1 402 and/or the WTRU2 404 may establish and/or modify a PDU session with their respective network. Further, in some examples, the UP connection for the PDU session may not yet be active.

At 422, the WTRUs may, based on the information exchanged between the DDNMFs/ProSe AS, determine (e.g., may mutually determine) to switch the communication path from the PC5 interface to the Uu interface. Both DDNMFs (e.g., DDNMF1 405*a* and/or DDNMF2 405*b*) may then send the path switch request (e.g., indicating a switch from the PC5 interface to the Uu interface) to each of the corresponding WTRUs. The path switch request may, for example, include information to assist the WTRU to establish the PC5 connection. For example, the DDNMF (e.g., DDNMF1 405*a* and/or DDNMF2 405*b*) may include the discovery codes/filters, QoS information, peer WTRU layer 2 ID, security policy etc. in the path switch request 422. The path switch trigger message 422 may also, or alternatively, include information to inform the WTRUs, if the path switch is intended to be a temporary path switch or a permanent path switch. If, for example, the path switch is intended to be a temporary path switch, the path switch trigger message may include the possible validity time period/window. The WTRUs may start a received timer and, upon expiration of the received timer, the WTRU may be configured to implicitly switch the path back to PC5 communication.

Additionally or alternatively, as shown at 424, the NWDAF (e.g., NWDAF1 407*a* and/or NWDAF2 407*b*). may indicate (e.g., via a path switching request) to the NF (e.g., NF1 403*a* and/or NF2 403*b*) at 426*a* and/or 426*b* if any of the conditions for path switching from the PC5 interface to the Uu interface have been met. For example, the path switching request may include the WTRU IDs, a location area (e.g., based on tracking area), and/or a max time window before the Uu connection must be established for seamless switching (e.g., for UP connection). If, for example the Uu connection is not established before the max time window expires, path switching may not be performed.

NF1 403*a* may be configured to trigger a path switch, e.g., by transmitting a path switch request 428*a* to WTRU1 402. Similarly, NF2 403*b* may be configured to trigger path switch 428*b*, e.g., by transmitting a path switch request to WTRU2 404. For example, each of the path switch requests (e.g., 428*a* and/or 428*b*) may include a timer value before which path switching must be completed. In an example, the trigger may also, or alternatively be transmitted to one of the peer WTRUs (e.g., WTRU1 402 and/or WTRU2 404 may be ready/synchronized to perform a path switch).

As shown in FIG. 4, WTRU1 402 and/or WTRU2 404 may be configured to transmit an indication of a path switch 430 to each other. The indication 430 transmitted by WTRU1 402 and/or WTRU2 404 may include the IP address of their respective PDU sessions. If, for example, both WTRUs have received an indication/trigger from the network to perform path switching, WTRU1 402 and/or WTRU2 404 may not transmit the indication 430 of the path switch to each other. Additionally, WTRU1 402 and/or WTRU2 404 may be configured to notify their respective applications about the path switching. WTRU1 402 and/or WTRU2 404 may also be configured to notify their respective peer WTRU's IP address, and/or switch traffic from PC5 link to Uu interface.

As described herein, a WTRU may be configured to perform a communication path switch from the Uu interface to the PC5 interface. One or more of the following may apply. Peer WTRUs may be configured to communicate via the Uu interface. The peers WTRUs may determine (e.g., may collectively determine/agree) to enable path switching at the application layer, which may pass this information (e.g., that path switching has been enabled) to the ProSe layer together with certain information to identify the peer WTRU over the PC5 interface (e.g., for future use, as described herein). For example, information to identify the peer WTRU over the PC5 interface may include WTRU1's user information and/or WTRU2's user info associated to the application. The application may also, or alternatively, transmit (e.g., forward) the IP address associated to the PDU session (e.g., the IP address to be switched to PC5 interface) to the ProSe layer.

A WTRU may be configured to determine whether/when to switch the communication path from the Uu interface over to the PC5 interface. For example, the WTRU may be configured to determine whether/when to perform a path switch to the PC5 interface based on a preferred interface (e.g., application preferred interface) or a link quality. The WTRU may also, or alternatively, be configured to determine whether/when to perform a path switch to the PC5 interface based on a trigger received from the network.

A WTRU may be configured to determine whether/when to perform a path switch to the PC5 interface based on a preferred interface. One or more of the following may apply. A WTRU may be configured (e.g., provisioned) to communicate with peer WTRUs via the Uu interface. However, in certain scenarios, the preferred interface associated with the application currently running on the WTRU may specify that the PC5 interface is the preferred interface. The WTRU may be configured to trigger a path switch, for example, during PC5 link establishment with the peer WTRU or upon/after PC5 link establishment (e.g., if the link quality of the PC5 interface meets the link quality threshold, as provisioned for this application).

A WTRU may be configured to determine whether/when to perform a path switch to the PC5 interface based on a link quality. One or more of the following may apply. In examples, the preferred interface associated with the application currently running on a WTRU may specify that the Uu interface is the preferred interface. However, the WTRU may be getting out of network coverage (e.g., due to WTRU mobility), and/or the link quality over the Uu interface may fall below a link quality threshold. The WTRU may be configured to determine to perform a path switch to the PC5 interface, for example, in response to the Uu link quality falling below a link quality threshold.

A WTRU may be configured to determine whether/when to perform a path switch to the PC5 interface based on a trigger received from the network. One or more of the following may apply. In certain scenario, the network may trigger the WTRUs to switch from the Uu interface to a direct PC5 connection. For example, the network may trigger the WTRUs to perform a path switch to the PC5 interface based on certain criteria, such as network congestion, an anticipated drop in link quality, and/or predictive QoS measurements.

Figure 5:
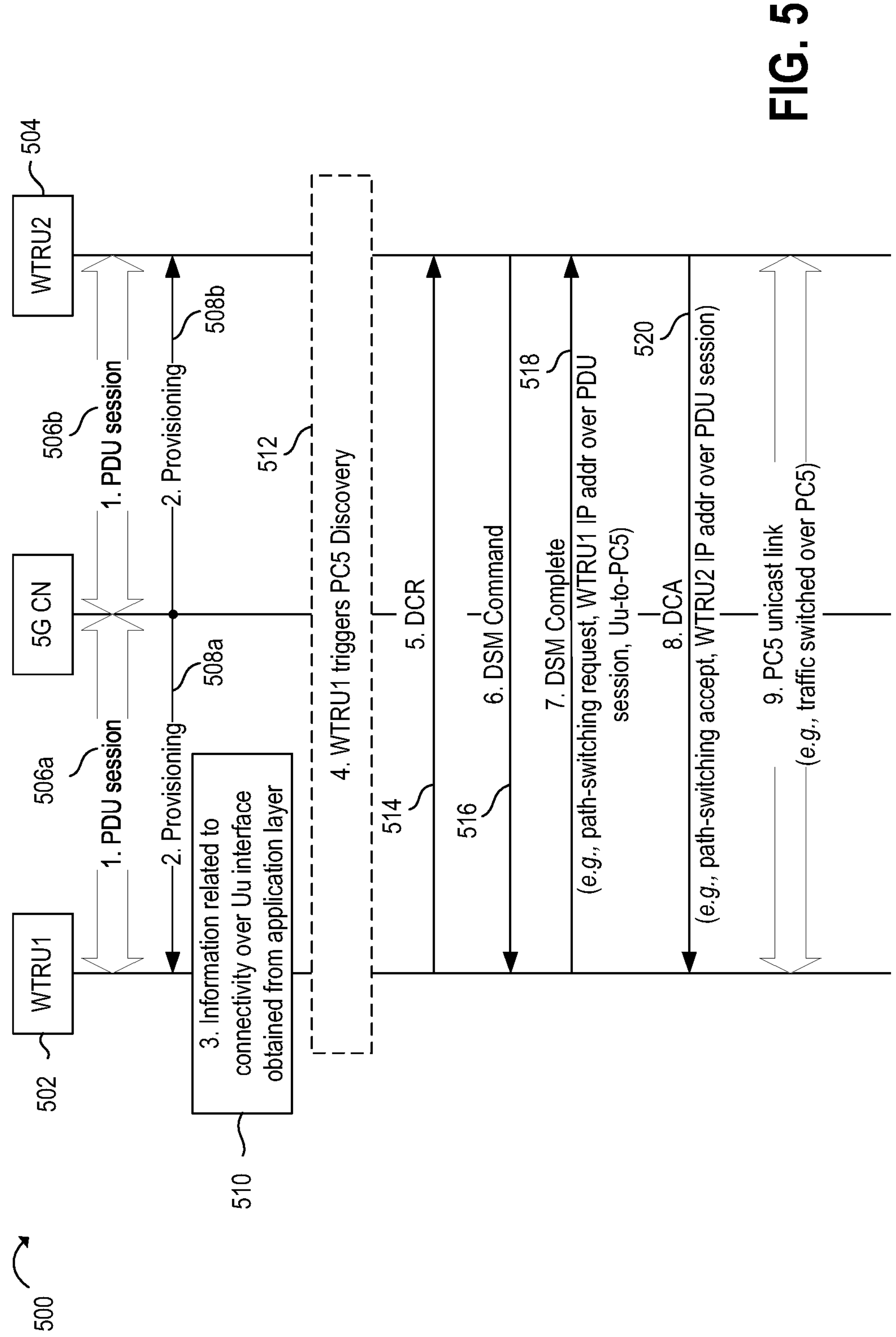
FIG. 5 illustrates an example path switching procedure associated with switching from a direct Uu interface to a direct PC5 interface.

FIG. 5 illustrates an example path switching procedure 500 for switching from a direct Uu interface to a direct PC5 interface. As illustrated in FIG. 5, the WTRUs (e.g., WTRU1 502 and/or WTRU2 504) may agree to enable path switching functionality, and/or exchange information relating to a PDU session (e.g., active/inactive, established/released, etc.). For example, the WTRUs (e.g., WTRU1 502 and/or WTRU2 504) may be configured to use the keepalive mechanism to exchange information about the PDU session, during a PC5 discovery procedure and/or PC5 link establishment procedure. Up-to-date status information on the PDU session may enable path switching capabilities from the PC5 interface to the Uu interface (e.g., if peer WTRUs are not in proximity to each other for a period of time).

In examples, the PC5 link establishment procedure may be used to trigger path switching from the Uu interface to the PC5 interface. Also, or alternatively, a PC5 link establishment procedure may be followed by a PC5 path switching procedure.

As illustrated in FIG. 5, WTRU1 502 and/or WTRU2 504 may each establish a PDU session (e.g., at 506*a* and/or at 506*b*) with the network. WTRU1 502 and WTRU2 504 may each also be provisioned (e.g., at 508*a* and/or at 508*b*) with one or more of the following: a path switching capability (e.g., path switching enabled/disabled), path switching policies, and/or a path switching information sharing method (e.g., the keepalive mechanism). At 510, the WTRU1 502 may obtain information related to connectivity over the Uu interface (e.g., obtained from the application layer). For instance, the ProSe layer (e.g., of the WTRU1 502) may retrieve/obtain the respective IP address used over the respective PDU session, e.g., from the application layer. The Prose layer may also retrieve/obtain the respective application user information at 510 (e.g., the ProSe layer may retrieve/obtain WTRU1's and/or WTRU2's respective application user information).

The ProSe layer (e.g., of the WTRU1 502) may trigger a PC5 discovery procedure (e.g., at 512). For example, the PC5 discovery procedure may be used to discover the WTRU2 504 over the PC5 interface, e.g., using the WTRU2 504 application user information. The trigger to establish the PC5 unicast link and/or the path switching may be received from the application layer. In certain scenarios, the ProSe layer may not trigger a PC5 discovery procedure 512 and/or discovery of WTRU2 504 may be performed during the PC5 link establishment procedure (e.g., 514 in FIG. 5).

As shown in FIG. 5, the WTRU1 502 may be configured to trigger the PC5 unicast link establishment by transmitting a DCR message 514 to WTRU2 504. For example, the DCR message 514 may include a path-switching request and/or the WTRU1's PDU session IP address. The WTRU2 504 may be configured to trigger a security establishment procedure, for example, by transmitting a DSM command message 516 to the WTRU1 502. The DSM command message 516 may include a path-switching accept and/or WTRU2's PDU session IP address.

The WTRU1 502 may be configured to complete the security establishment procedure, for example, by transmitting a DSM complete message 518 to the WTRU2 504. For example, the DSM complete message 518 may include a path-switching request indication and/or WTRU1's PDU session IP address. Also, or alternatively, the path-switching request and/or WTRU1's PDU session IP address may be included in the DCR message 514.

The WTRU2 504 may be configured to complete the PC5 link establishment, for example, by transmitting a DCA message 520. The WTRU2 may transmit a DCA message 520 to the WTRU1 502. For example, the DCA message 520 may include the path-switching accept indication and WTRU2's PDU session IP address. Also, or alternatively, the path-switching request and/or WTRU2's PDU session IP address may be included in the DSM command message 518. If, for example, the WTRU2 504 determines not to switch the traffic from the PDU session to the PC5 interface, the WTRU2 504 may be configured to transmit a DCA message 520 that includes a path-switching reject indication to the WTRU1 502. The WTRU1 502 and/or WTRU2 504 may be configured to indicate the path switch to the application layer, and/or application traffic may be switched over to the PC5 interface.

Figure 6:
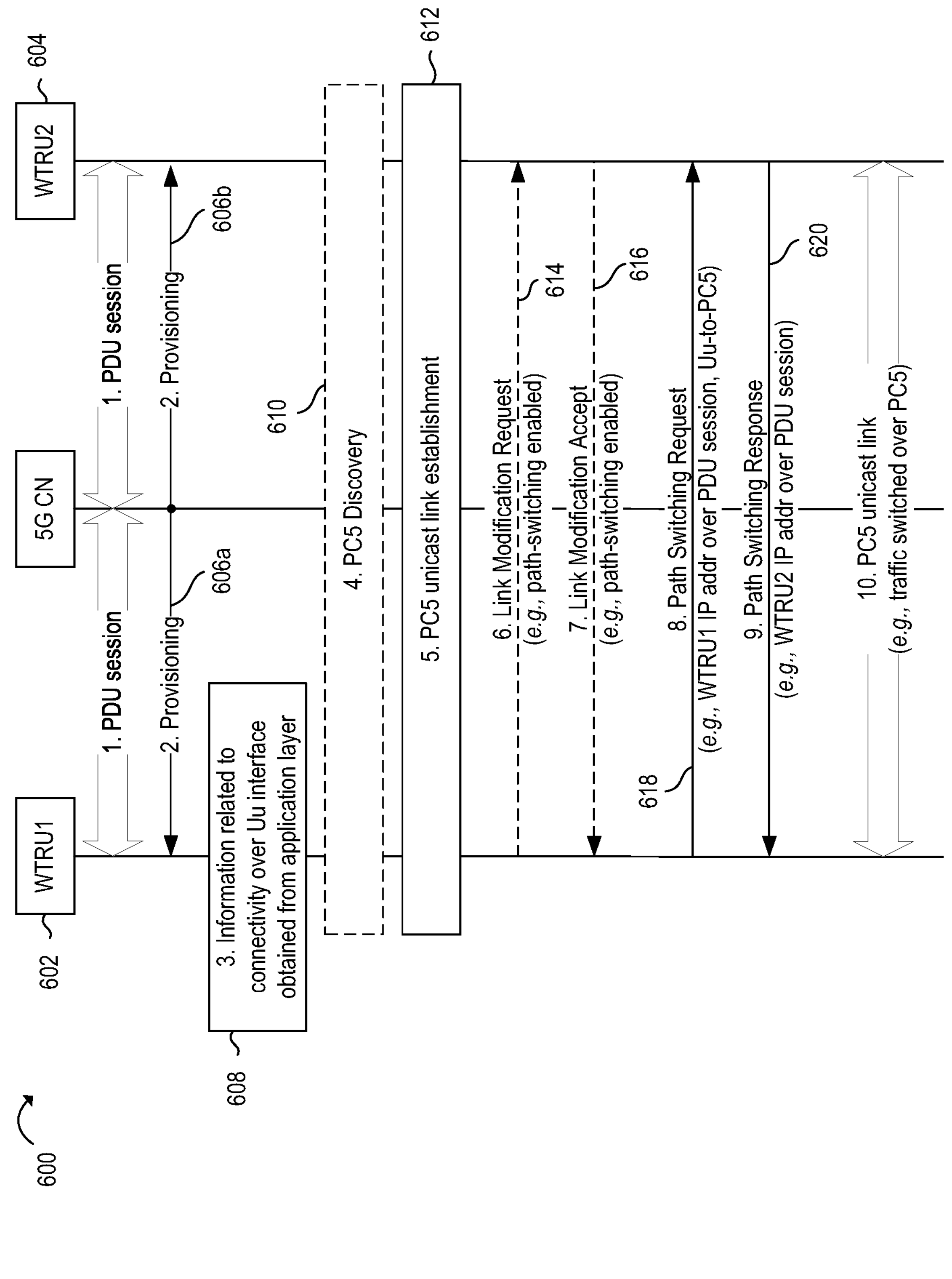
FIG. 6 illustrates another example path switching procedure for switching from a direct Uu interface to a direct PC5 interface.

FIG. 6 illustrates an example path switching procedure for switching from a direct Uu interface to a direct PC5 interface 600. Referring to the example illustrated in FIG. 6, the WTRUs may determine (e.g., collectively determine/agree) to enable path switching functionality after PC5 link establishment. For example, the WTRUs may determine to enable path switching functionality using a PC5 link modification procedure and/or a path switching procedure. A WTRU may be configured to trigger a path switch from the Uu interface to the PC5 interface, for example, either prior to or after the path switching negotiation between peer WTRUs (e.g., after the link modification procedure).

The WTRU1 602 and/or the WTRU2 604 may each establish a PDU session with the network. The WTRU1 602 and/or WTRU2 604 may each be provisioned (e.g., at 606*a* and/or 606*b*) with one or more of the following: a path switching capability (e.g., path switching enabled/disabled), path switching policies, and/or a path switching information sharing method (e.g., keepalive procedure). For example, the WTRU1 602 and/or the WTRU2 604 may be configured with path switching policies that indicate that PC5 is the preferred interface.

The ProSe layer may retrieve/receive information (e.g., at 608) related to connectivity over the Uu interface and/or the PDU session (e.g., the IP address being used over the respective PDU sessions, WTRU1's application user information, and/or WTRU2's application user information) from the application layer. The WTRUs may be configured to treat the ProSe layer's retrieval/reception of this information as a trigger (e.g., a network or application trigger) to perform path switching.

The WTRU1 602 may be configured to determine whether a PC5 link between WTRU1's user information and WTRU2's user information exists. If the WTRU1 602 determines that a PC5 link doesn't exist, the WTRU1 602 may be configured to trigger a PC5 discovery procedure (e.g., at 610) over the PC5 interface and/or discover WTRU2 604. In examples, the WTRU1 602 may not trigger a PC5 discovery procedure 610 over the PC5 interface and/or discover the WTRU2 604 if the WTRU1 602 determines that a PC5 link doesn't exist. Instead, the WTRU1 602 may perform PC5 link establishment 612 with WTRU2 604. If WTRU1 602 determines that a PC5 link does exist, the WTRU1 602 may either transmit a link modification request message 614 and/or transmit a path switching request 618.

At 612, a PC5 link may be established between the WTRU1 602 and the WTRU2 604, and/or the ProSe layer may notify the respective application layers about the PC5 link establishment between the WTRU1 602 and the WTRU2 604. The WTRU1 602 and/or the WTRU2 604 may be configured to negotiate path switching functionality enablement, for example, by using a link modification procedure. For example, the WTRU1 602 may be configured to transmit a link modification request 614 that includes a path-switching enabled indication as a parameter, if path switching functionality was not already enabled at PC5 link establishment. A peer WTRU (e.g., WTRU2 604) may be configured to transmit an acknowledgement, for example, in a link modification accept message 616. A similar link modification procedure may be used by the WTRUs to disable the path switching. For example, when path switching is enabled on a PC5 link, the WTRU1 602 may transmit a link modification request 614 that includes a "path-switching disabled" indication and/or the acknowledgement transmitted by the WTRU2 604 may include the same "path-switching disabled" indication.

The WTRU1 602 and/or the WTRU2 604 may not transmit the respective link modification request 614/link modification accept message 616, And/or instead the WTRU1 602 may transmit a path switching request 618 (e.g., the WTRU1 602 may not send a Link Modification Request 614 to the WTRU2 604 and/or the WTRU1 602 may not receive a Link Modification Accept 616 from the WTRU2 604).

The WTRU2 604 may be configured to accept the path switching enablement, for example, by transmitting a link modification accept message 616 that includes a "path-switching enabled" indication/parameter. Similarly, the WTRU2 604 may be configured to reject the path switching enablement, for example, by transmitting a link modification reject message that includes a "path switching enablement rejected" indication/parameter.

The path switching procedures described herein (e.g., the path switching procedures described with respect to FIG. 2) may also, or alternatively be used to perform the path switching between the WTRU1 602 and the WTRU2 604. For example, as shown in FIG. 6, the WTRU1 602 may be configured to transmit a path switching request 618 to the WTRU2 604. At 618, the path switching request transmitted by the WTRU1 602 may be triggered after (e.g., transmitted in response to) PC5 link establishment and/or path switching negotiation (e.g. some time after). The WTRU1 602 may be configured to wait for certain thresholds to be met, e.g., acceptable QoS over PC5 link and/or low network coverage.

The WTRU2 604 may be configured to accept the path switching request 618, for example, by transmitting a path switching response message 620 to the WTRU1 602. Similarly, the WTRU2 604 may be configured to reject the path switching request, for example, by transmitting a path switching reject message that includes an indication for rejecting the path switch (e.g., "not ready for path switching" or "destination link not available"). The WTRU1 602 and/or the WTRU2 604 may be configured to notify and/or inform their respective application layers about the path switch, and/or application traffic may be switched over to the PC5 link.

Although not shown in FIG. 6, the WTRU1 602 and the WTRU2 604 may already have a PC5 link established prior to the path switching decision (e.g., from Uu to PC5). In this case, PC5 discovery and/or PC5 unicast link establishment may not be performed. Similarly, if the path switching enablement and/or policies have already been agreed by the PC5 peer WTRUs, link modification request/accept messages may not be transmitted.

Figure 7:
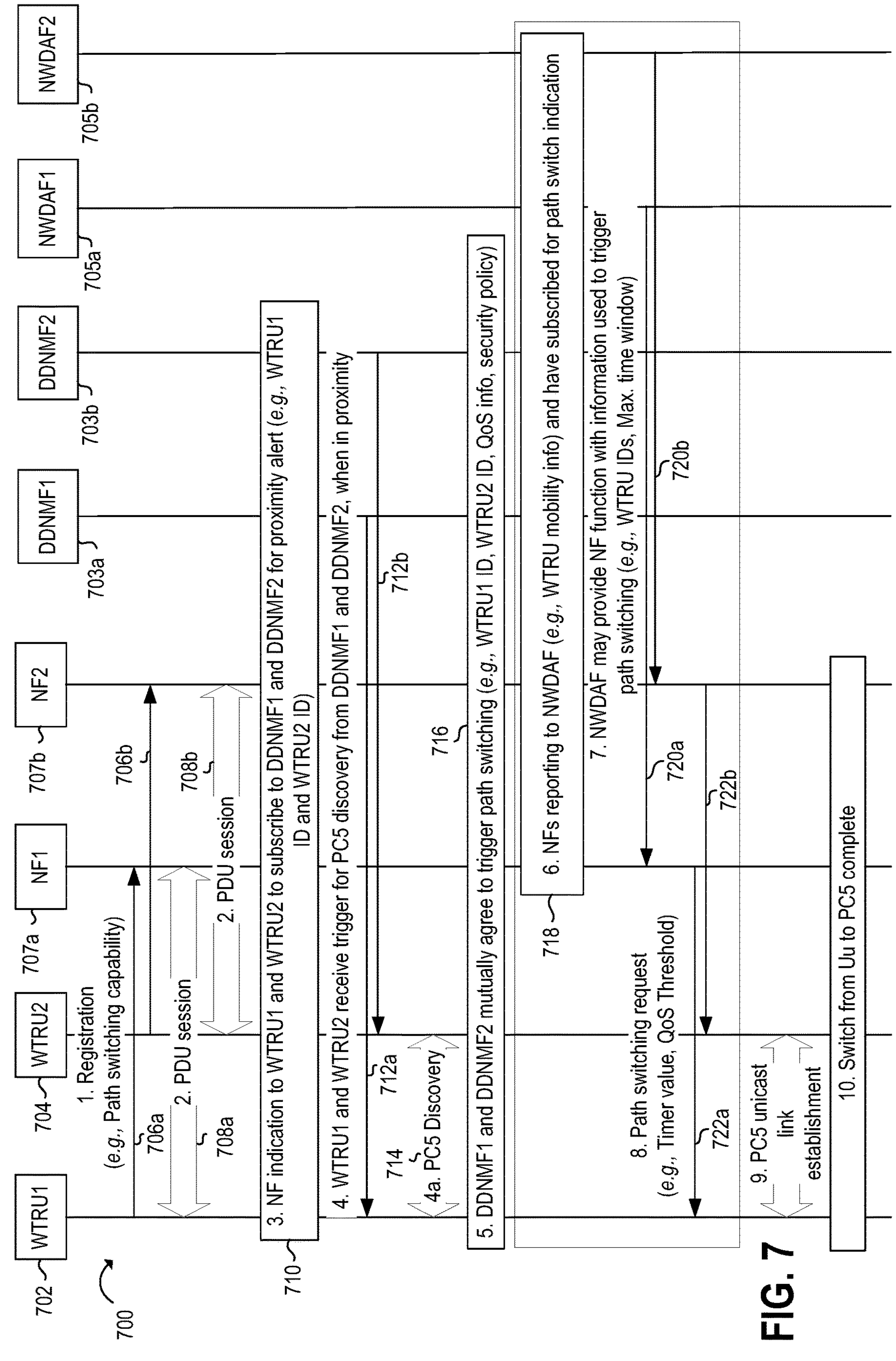
FIG. 7 illustrates another example procedure for network triggered path switching from a direct Uu interface to a direct PC5 interface.

FIG. 7 illustrates an example procedure for network triggered path switching 700. One or more of the following may apply. The network may control and/or provide assistance for Uu to PC5 path switching. For example, if the network is experiencing congestion, the network may trigger one or more WTRUs to perform a path switch to the PC5 interface. In other scenarios, such as, due to WTRUs mobility and/or real-time radio conditions, a prediction and/or network analytics function may predict/anticipate QoS degradation, and/or link failure, (e.g., car approaching a tunnel and/or driving down to an underground parking etc.), and/or the network may trigger path switching for one or more WTRUs from the Uu interface to the PC5 interface. In these scenarios, certain network functions, such as AMF, SMF, UPF, DDNMF, and/or application functions for application-based triggers, may report and/or subscribe to certain analytics function(s) in the network. For example, network functions may subscribe to NWDAF, which may perform analytics and/or indicate/trigger path switching to the appropriate network function.

In examples, WTRUs may have a PDU session established over the Uu interface and/or, in response to a network trigger, may switch to the PC5 interface. For example, the network may trigger a path switch based on certain network analytics. Peer WTRUs may have already been discovered over the PC5 interface. Similarly, PC5 link may have already been established. However, WTRUs may be configured to wait for a network trigger before initiating/performing a path switch from the Uu interface to the PC5 interface. In certain scenarios, PC5 links may not be established between peer WTRUs, and/or PC5 links will be established after the network has triggered path switching.

As shown in FIG. 7, the WTRU1 702 and/or the WTRU2 704 may provide the network (e.g., 707*a* and/or 707*b*) with their respective path switching capabilities (e.g., from PC5 to Uu (or vice versa)) during initial network registration (e.g., at 706*a* and/or 706*b*). Also, or alternatively, path switching capabilities may be associated to a PDU session (e.g., at 708*a* and/or 708*b*), and/or a WTRU may be configured to transmit the path switching to PC5 capabilities when the establishes a PDU session. The WTRU may be configured to transmit a request that a given PDU session (e.g., at 708*a* and/or at 708*b*) be subject to network path switching assistance, for example, during PDU session establishment. The SMF may verify that path switching assistance is authorized, for example, based on a subscription with UDM and/or an operator policy with PCF. As described herein, the SMF may communicate with NWDAF, for example, to assist in path switching decisions (e.g., to obtain predictive service experience data on a Uu link). The WTRU may receive acknowledgement that network assisted path switching is enabled for the PDU Session, e.g., in a PDU session accept message.

The WTRU1 702 and/or the WTRU2 704 may continue to communicate over the Uu link, e.g., the established PDU session (e.g., at 708*a* and/or at 708*b*). At 710, Network Functions, such as the AMF, may indicate that a respective WTRU subscribe to a respective DDNMF, e.g., to obtain proximity alerts. At 710, for example, the WTRU1 702 and/or the WTRU2 704 may subscribe to the proximity alert with their respective DDNMF. The respective DDNMFs may trigger discovery (e.g., at 712*a* and/or 712*b*) when the WTRU1 702 and/or the WTRU2 704 is/are in proximity. At 714, the WTRU1 702 and/or the WTRU2 704 may perform PC5 discovery and/or a PC5 link may be established (e.g., but not necessarily used). If, for example, the WTRUs have already established their PC5 link, the WTRUs may be configured to request network path switching assistance with a PSAF (e.g., DDNMF, SMF), as described herein with respect to FIG. 4.

In examples, the DDNMF1 703*a* and/or the DDNMF2 703*b* may determine (e.g., collectively determine) to trigger path switching. For example, the DDNMF1 703*a* and/or the DDNMF2 703*b* may determine (e.g., collectively determine) to trigger path switching based on the information exchanged between the DDNMFs/ProSe AS for the two WTRUs. At 716, as illustrated in FIG. 7, both DDNMFs (e.g., DDNMF1 703*a* and/or DDNMF2 703*b*) may transmit a path switch request (e.g., from the Uu interface to the PC5 interface) to each of the corresponding WTRUs. The path switch request information may include information to assist the WTRU establish the PC5 connection. For example, the DDNMF (e.g., DDNMF1 703*a* and/or DDNMF2 703*b*) may transmit one or more of the following: discovery codes/filters, QoS information, peer WTRU layer 2 ID, security policy, etc. The path switch trigger message may include information to inform the WTRUs the path switch is temporary or permanent. If the path switch is temporary, the path switch trigger message may include a validity time period/window associated with the temporary path switch. The WTRUs may be configured to start the received timer and/or, upon expiration of the timer, transition the communication path back to the Uu interface.

In examples, at 718, certain network functions (NF), such as AMF, SMF, UDM etc. may report and/or subscribe for path switching indications, and/or provide the WTRU mobility information, including, tracking area, timestamps etc., to the NWDAF (e.g., 705*a* and/or 705*b*).

At 720*a* and/or 720*b*, for example, the NWDAF (e.g., 705*a* and/or 705*b*) may provide certain network functions (e.g., SMF/PCF) with certain information that may be used by the respective network functions to determine if the conditions for path switching have been met (e.g., based on service experience data). For example, the information provided by the NWDAF (e.g., 705*a* and/or 705*b*) may include one or more of the following: WTRU IDs, WTRU location (e.g., based on tracking area), and/or max time window before the PC5 link must be established.

As shown in FIG. 7, the NF1 707*a* may trigger a path switch to the WTRU1 702 and/or the NF2 707*b* may trigger a path switch to the WTRU2 704 (e.g., based on information received by the NWDAF). For example, the NF1 707*a* and/or the NF2 707*b* may transmit a path switching request (e.g., at 722*a* and/or 722*b*) that includes a timer value before which the path switch must be completed, and/or a QoS threshold. In response to the respective path switching requests (e.g., at 722*a* and/or 722*b*), the WTRU1 702 and/or the WTRU2 704 may perform unicast link establishment with each other over the PC5 interface. Also, or alternatively, if a PC5 link is already established between the WTRU1 702 and the WTRU2 704, the path switching procedures described with respect to FIG. 5 may be performed (e.g., procedure 8-10 of FIG. 6 may be performed). The WTRU1 702 and/or the WTRU2 704 may inform their respective applications about the path switch, and/or traffic may be switched from the PDU session to the PC5 link.

A WTRU may be provisioned with one or parameters associated with path switching (e.g., path switching parameters). One or more of the following may apply. A WTRU may be configured with path switching policy that indicates whether path switch between the Uu interface to/from the PC5 is allowed. For example, the path switching policy may further indicate whether path switch between the Uu interface to/from the PC5 is allowed for each ProSe service. If, for example, multiple ProSe services are used for an application, a different path switching policy may be applied for each ProSe service. The WTRU may be provided with path switch parameters (e.g., including a list of allowed QoSs for PC5 QoS flows) for each ProSe service that is allowed to perform path switching. The selected PC5 QoS flow with corresponding QoS level (e.g., selected from the list of allowed QoSs) may be switched to a QoS flow with a corresponding QoS level in a PDU session associated with the Uu interface. In certain scenarios, the path switching parameters may include a QoS list. If provided, the QoS list in the path switch parameters may include a subset of the QoS list in the ProSe parameter for the ProSe service (e.g., which may be provided by the network). If the QoS list is not provided, the WTRU may determine to use the QoS list included in the ProSe parameters for the ProSe service as the list of allowed QoSs for PC5 QoS flows.

Also, or alternatively, a WTRU may be provided with one or more PDU session parameters (e.g., DNN, SSC mode, S-NSSAI, etc.). The WTRU may, for example, use the PDU session parameters to establish a PDU session over the Uu interface (e.g., for an application that uses that ProSe service). In certain scenarios, the WTRU may be assigned to a dedicated DNN and/or network slice for a given application.

For example, the PDU session parameters may be provided to the WTRU via a WTRU route selection policy (URSPI) rule.

An AF relating to a given application may provide and/or be associated with certain application level session information. When an AF relating to an application provides application level session information (e.g., including service requirements and/or a list of target WTRUs), the AF may also, or alternatively, include an indication that path switching is allowed between the PC5 interface and the Uu interface for the application.

A policy control function (PCF) may receive certain application level session information for a given application. When a PCF receives application level session information for an application, the PCF may determine a policy and charging control (PCC) rule for an existing or future PDU session relevant to the application. If the PCF is aware that path switch between the PC5 interface and the Uu interface is allowed for the application (e.g., while the PCF is determining an associated PCC rule), the PCF may include a list of QoS for a QoS flow for the Uu interface and/or a list of QoS of a PC5 QoS flow for the PC5 interface (e.g., for the application to be compatible for path switching).

The PCF may provision the WTRU with a security policy (e.g., a security policy per ProSe service), which may indicate whether each of signaling, user plane (UP) confidentiality, and/or integrity protection are required, preferred, or not needed for the PC5 interface. On the Uu side, the RAN may, for example, activate UP confidentiality and/or UP integrity protection (e.g., for each DRB of the PDU session according to a network UP security policy). The WTRU may determine whether a QoS flow can be switched between the PC5 interface and the Uu interface, for example, based on the verification of a compatible UP security level between the PC5 interface and the Uu interface. For example, if UP confidentiality protection is not activated for the PDU session, the WTRU may determine that a QoS flow associated with a ProSe service (e.g., a ProSe service for which the security policy indicates confidentiality as preferred or not needed can be switched to the Uu interface. Also, or alternatively, the WTRU may not switch the QoS flow of a ProSe service for which the security policy indicates confidentiality as required.

Figure 8:
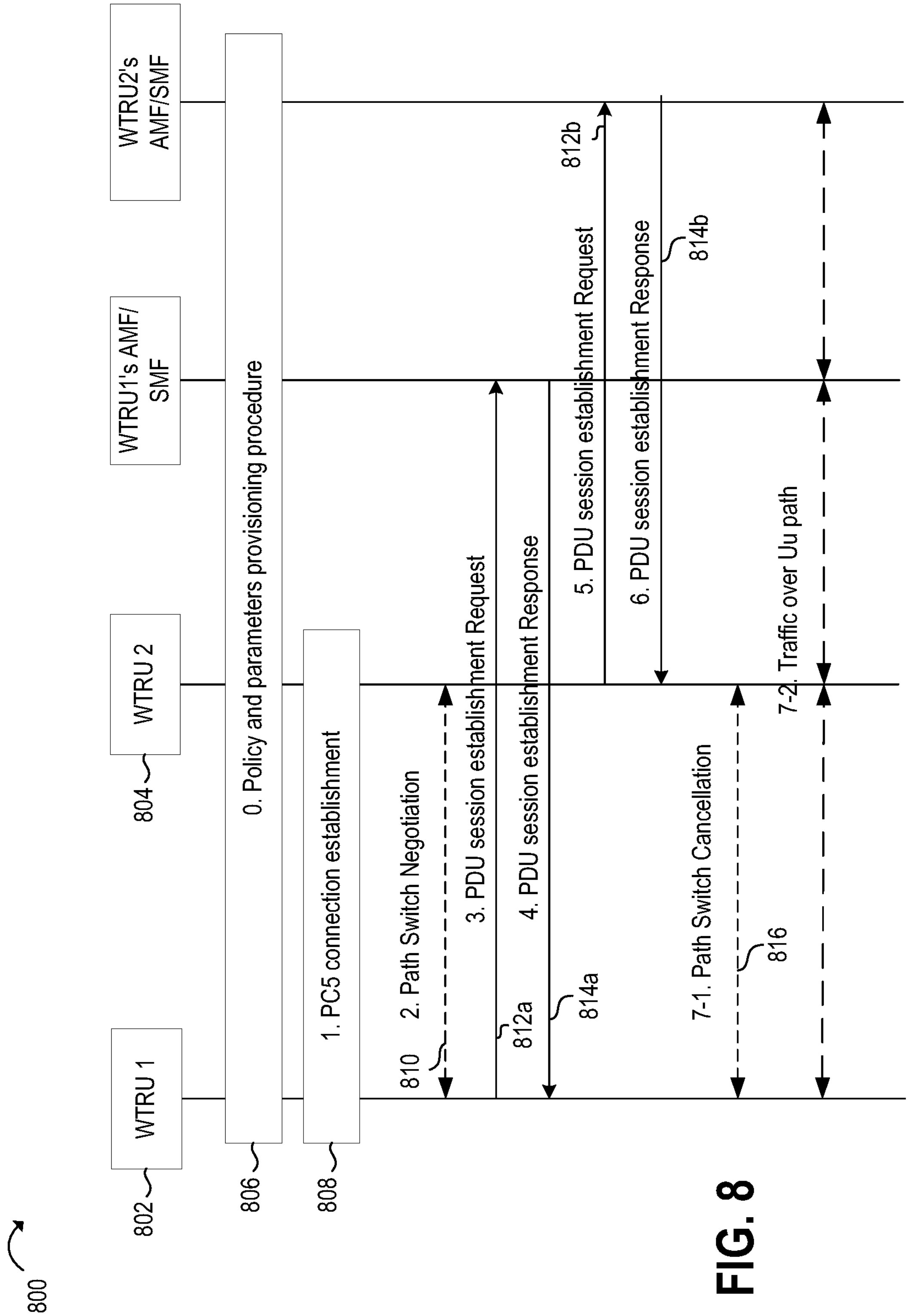
FIG. 8 illustrates an example path switching procedure from the PC5 interface to the Uu interface with path switching parameter provisioning.

FIG. 8 illustrates an example path switching procedure from the PC5 interface to the Uu interface with path switching parameter provisioning 800. One or more of the following may apply. At 806, as shown in FIG. 8, the WTRU1 802 and/or the WTRU2 804 may be provided with path switching policy and/or associated parameters (e.g., path switching parameters). At 808, the WTRU1 802 and/or the WTRU2 804 may establish a PC5 unicast connection (e.g., including PC5 QoS flows) for a given application. For example, the target QoS of the PC5 QoS flows may be selected (e.g., from the list of allowed QoSs for PC5 QoS flows associated with the ProSe service for the application). At 810, while communicating with each other for the application, for example, the WTRU1 802 and/or the WTRU2 804 may decide to perform a path switch from the PC5 interface to the Uu interface for the ProSe service(s). The WTRU1 802 and/or the WTRU2 804 may negotiate/determine whether to perform the path switch for the ProSe service(s). Also, or alternatively, the path switch negotiation/determination 810 may be performed after PDU session establishment (e.g., after the WTRU 1 802 receives a PDU session establishment response at 814*a*). If, for example, path switch negotiation/determination 810 is performed after PDU session establishment, the path switch negotiation 810 may include an indication that a PDU session establishment for the application from WTRU1 802 was successful and/or that a PDU session establishment for the application from WTRU2 804 was successful.

At 812*a*, the WTRU1 802 may request a PDU session establishment to a network (e.g., the 5GCN) with certain PDU session parameters (e.g., DNN, SSC mode, and/or S-NSSAI) that are assigned for the application which the ProSe service is used for. The WTRU1 802 may request a PDU session to a network after determining to perform a path switch. The WTRU1 802 may indicate that the requested PDU session is to serve an application whose traffic flows are to be switched from the PC5 interface to the Uu interface. After receiving a PDU session establishment request 812*a*, the network (e.g., 5GCN) may be aware that the WTRU1 802 requests a PDU session for an application to be switched from the PC5 interface and/or the Uu interface (e.g., according to the indication and/or the requested DNN, if it is dedicated for an application allowing path switch between the PC5 interface and/or the Uu interface). Based on an associated PCC rule, the network (e.g., 5GCN) may authorize the PDU session establishment request and/or assign QoS flows with QoS rules for the application, which may be included in the PDU session response at 814*a*. After successful PDU session establishment, for example, the WTRU1 802 may send path switch request to the WTRU2 804. The path switch request may also, or alternatively, include PDU session setup result.

Also, or alternatively, after receiving a path switching response from the WTRU2 804, the WTRU1 802 may trigger the PDU session establishment. If, however, a path switching reject is received, the WTRU1 802 may not establish a PDU session and/or may release and/or deactivate a PDU session which is established before for the application to path switch.

At 812*b*, after determining to perform a path switch, for example, the WTRU2 804 may request PDU session establishment with the network (e.g., 5GCN) with certain PDU session parameters (e.g., DNN, SSC mode, and/or S-NSSAI) that are assigned for the application associated with the respective ProSe service. The WTRU2 804 may indicate that the requested PDU session is to serve an application whose traffic flows are to be switched from the PC5 interface to the Uu interface. After receiving a PDU session establishment request, for example, the network (e.g., 5GCN) may be aware that the WTRU2 804 requests a PDU session for an application to be switched from the PC5 interface and/or the Uu interface (e.g., according to the indication and/or the requested DNN, if it is dedicated for an application allowing path switch between the PC5 interface and the Uu interface). Based on an associated PCC rule, the network (e.g., 5GCN) may authorize the PDU session establishment request and/or assign QoS flows with QoS rules for the application, which may be included in the PDU session response at 814*b*. When the WTRU2 804 receives a path switch request, the WTRU2 804 may respond with path switch response. The WTRU2 804 may include the result of PDU session establishment in the response of the received path switch request from the WTRU1 802.

Also, or alternatively, PDU session establishment may be performed after receiving path switching request from the WTRU1 802, and/or the WTRU2 804 may respond to the path switching request based on the result of the PDU session establishment. At 816, the WTRU1 802 and/or the WTRU2 804 may cancel the path switch if the PDU session establishment fails, and/or PDU session establishment does not include QoS flows with the QoS level compatible to the QoS level of PC5 QoS flows for the application, and/or if the activated PDU session security level is not compatible with the required security level of the selected PC5 QoS flows. If, however, PDU session establishments from the WTRU1 802 and/or the WTRU2 804 are successful, the WTRU1 802 and/or the WTRU2 804 may start to exchange the traffic for the application using the established PDU session.

Also, or alternatively, the WTRU1 802 and/or the WTRU2 804 may exchange further signaling, for example, to confirm that PDU session establishment is successful. After signaling, the WTRU1 802 and/or the WTRU2 804 may start to exchange the traffic for the application using the established PDU session.

Figure 9:
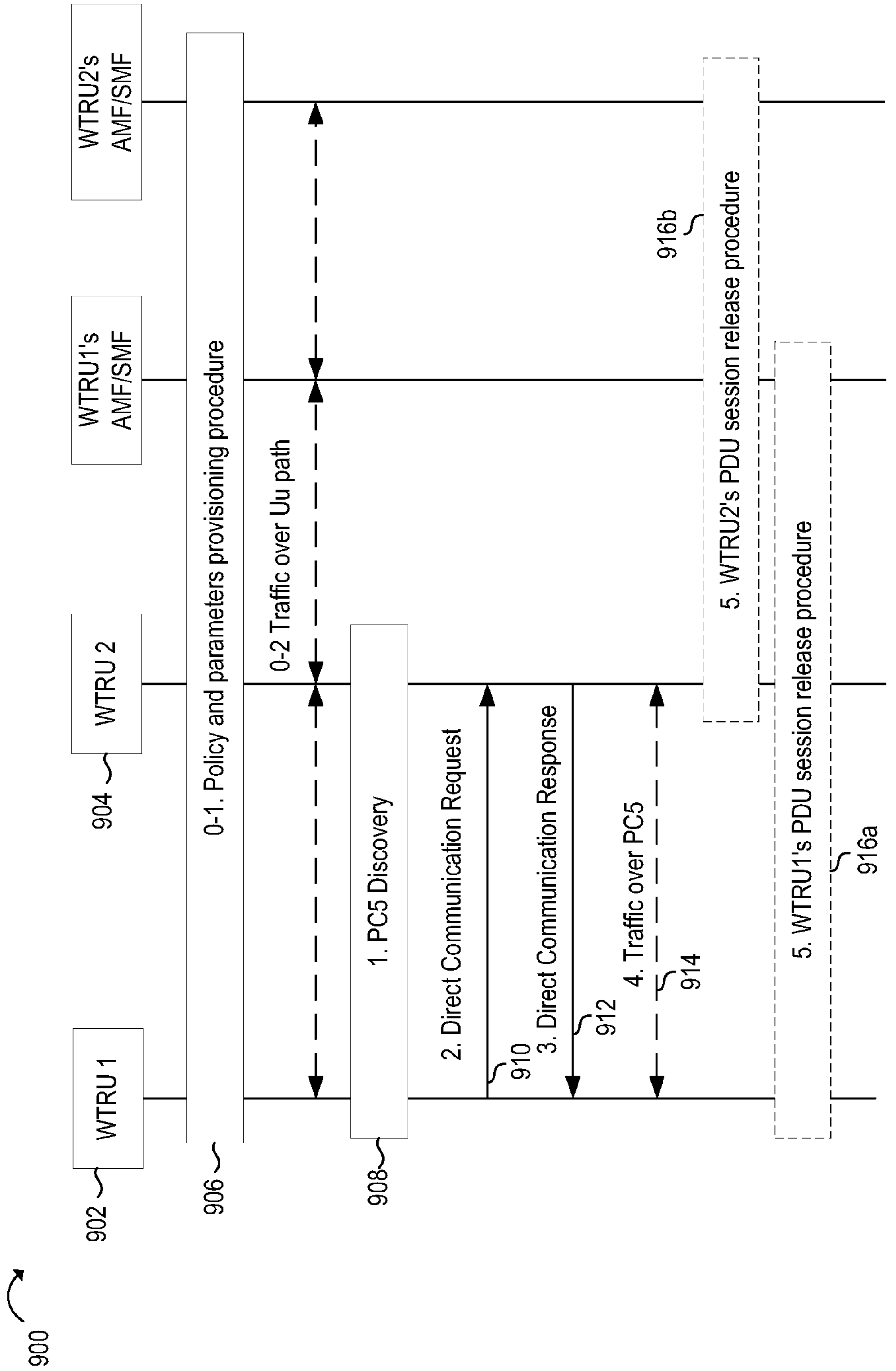
FIG. 9 illustrates an example path switching procedure from the Uu interface to the PC5 interface with parameter provisioning (e.g., path switching parameter provisioning).

FIG. 9 illustrates an example path switching procedure from the Uu interface to the PC5 interface with parameter provisioning 900 (e.g., path switching parameter provisioning at 906). One or more of the following may apply. As shown in FIG. 9, the WTRU1 902 and/or the WTRU2 904 may be provided with path switching policy and/or associated path switching parameters (e.g., at 906). The WTRU1 902 and/or the WTRU2 904 may establish PDU sessions and/or communicate with each other for a given application. According to the received path switching policy for the application, a path switching procedure from the Uu interface to the PC5 interface may be initiated. The WTRU1 902 and/or the WTRU2 904 may share (e.g., may both share) the PC5 related information for the application, such as identifier associated with the application (e.g., AppID1), and/or identifier of a user of WTRU1 902 (e.g., UserID1), and/or an identifier of a user of WTRU2 904 (e.g., UserID2).

The WTRU1 902 and/or the WTRU2 904 may initiate a switch path for application traffic from the Uu interface to the PC5 interface. For example, the path switch may be initiated based on path switching policies, from the application layer, etc. At 908, the WTRU1 902 and/or the WTRU2 904 may perform a PC5 discovery procedure. During the PC5 discovery procedure 908, the WTRU1 902 and/or the WTRU2 904 may discover each other, for example, using the relevant identifiers (e.g., AppID1, UserID1, and/or UserID2).

When sending an announce message, for example, the WTRU1 902 may include AppID1, UserID1, and UserID2 as application layer metadata. The WTRU2 904 may determine whether the application layer meta data includes the AppID1, UserID1, and/or UserID2. Also, or alternatively, UserID1 and/or UserID2 may be included in the User Info of a PC5 discovery message. Also, or alternatively, the AppID1, UserID1, and/or UserID2 may be used as input values to derive source Layer2 ID and/or target Layer2 ID for the PC5 discovery procedure.

At 910, the WTRU1 902 may send a direct communication request (DCR) message to the WTRU2 904. For example, the WTRU1 902 may include application information, user information of the WTRU1 902, and/or target user info of the WTRU2 904 in a DCR message 910. During or after security protection is enabled, the WTRU1 902 may send additional information, such as available QoS levels for PC5 QoS flow that are compatible with the QoS flows for the application traffic over the Uu interface. When the WTRU1 902 selects a certain QoS level, the WTRU1 902 may select the QoS level from the list of allowed QoSs for PC5 QoS flows. After receiving a DCR message 910 from the WTRU1 902, the WTRU2 904 may be aware that path switch is requested for the application (e.g., based on the application information, user info of WTRU1 902, and/or user info of WTRU2 904).

Also, or alternatively, the WTRU1 902 may include a path switch indication in DCR 910 transmitted to the WTRU2 904, and/or the WTRU2 904 may be aware that path switch is requested for the application according to the path switch indication.

When the WTRU2 904 receives the available QoS levels from the WTRU1 902, the WTRU2 904 may determine whether the QoS levels are within the list of allowed QoSs for WTRU2's PC5 QOS flows. If the QoS levels are within the list of allowed QoS for the WTRU2 904, the WTRU2 904 may accept the DCR 910, for example, by sending a direct communication accept message at 912. If the QoS levels are not within the list of allowed QoS for the WTRU2 904, the WTRU2 904 may select other QoS values from the list of allowed QoS for WTRUs and/or include the other QoS values in the Direct Communication Accept message 912 (e.g., via a reject code). When receiving Direct Communication Accept message 912 with reject code and alternative QoS levels, the WTRU1 902 may review the other QoS levels, and/or initiate another direct communication setup procedure and/or alternatively, the WTRU1 902 may accept the included QoS levels in the Direct Communication Accept message 912.

As shown in FIG. 9, if the path switch negotiation is successful (e.g., the PC5 link is successfully established with acceptable QoS levels), the WTRU1 902 and WTRU2 904 may exchange user traffic for the application (e.g., at 914) over the PC5 link. After a successful path switch, the WTRU1 902 and/or the WTRU2 904 may release the PDU session for the application (e.g., at **916*a* and/or 916*b***).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, terminal, base station, RNC, or any host computer.

What is claimed:

1. A first wireless transmit/receive unit (WTRU) comprising:

a processor configured to:

establish communication via a preferred PC5 communication link, wherein the communication via the preferred PC5 communication link is established based on application-specific criteria;

determine that at least one trigger for performing a path switch from the preferred PC5 communication link to a non-preferred Uu-based network communication link has occurred, wherein the at least one trigger for performing the path switch comprises a determination that a link quality of the preferred PC5 communication link is below a threshold;

send a path switching request to a second WTRU via the preferred PC5 communication link;

receive first information from the second WTRU, wherein the first information comprises a path switching response for communication via the non-preferred Uu-based network communication link;

perform Protocol Data Unit (PDU) session establishment with a network node or perform a PDU session modification procedure with the network node to establish or modify a network-based PDU session based on receiving the path switch response; and send second information to the second WTRU for communication via the non-preferred Uu-based network communication link, and wherein the second information is sent to the second WTRU in accordance with the application-specific criteria.

2. The first WTRU of claim 1, wherein the processor is configured to receive a message from a network node indicating that the path switching is allowed or policies for implementing path switching.

3. The first WTRU of claim 1, wherein the at least one trigger comprises the first WTRU being in a location area where path switching is allowed an indication from an application, or a Uu link quality being above a threshold.

4. The first WTRU of claim 1, wherein the processor is configured to establish a PC5 unicast link with a third WTRU, and wherein the network-based PDU session is established based on the PC5 unicast link with the third WTRU.

5. The first WTRU of claim 1, wherein the processor is configured to:

receive provisioning information, wherein the provisioning information comprises a path switch capability, one or more path switching policies, or a path switching information sharing method; and determine the at least one trigger for performing the paths switch is based on the provisioning information.

6. The first WTRU of claim 1, wherein the processor is configured to send the path switch request to the second WTRU based on a determination that one or more triggers have occurred, wherein the path switching request indicates whether the preferred PC5 communication link should be preserved after path switching.

7. The first WTRU of claim 1, wherein the path switching request is sent to the second WTRU via the PC5 communication link;

wherein a path switching response is received from the second WTRU via the preferred PC5 communication link; and wherein a path switching acknowledgement is sent to the second WTRU via the PC5 communication link.

8. The WTRU of claim 1, wherein the processor is configured to switch traffic or one or more proximity services from the preferred PC5 communication link to the non-preferred Uu-based network communication link.

9. The WTRU of claim 1, wherein the reception of the first information is indicative of the path switching request being accepted.

10. The WTRU of claim 1, wherein the processor is configured to:

receive an indication indicating the preferred PC5 communication link is the preferred communication link;

determine that a signal strength of the preferred PC5 communication link is less than the threshold to determine that the at least one trigger for performing the path switch from the preferred PC5 communication link to the non-preferred Uu-based network communication link has occurred; and determine to switch from the preferred PC5 communication link to the non-preferred Uu-based communication link.

11. A method performed by a first wireless transmit/receive unit (WTRU), the method comprising:

establishing communication via a preferred PC5 communication link, wherein the communication via the preferred PC5 communication link is established based on application-specific criteria;

determining that at least one trigger for performing a path switch from the preferred PC5 communication link to a non-preferred Uu-based network communication link has occurred, wherein the at least one trigger for performing the path switch comprises a determination that a link quality of the preferred PC5 communication link is below a threshold;

sending a path switching request to a second WTRU via the preferred PC5 communication link;

receiving first information from the second WTRU, wherein the first information comprises a path switching response for communication via the non-preferred Uu-based network communication link;

performing Protocol Data Unit (PDU) session establishment with a network node or performing a PDU session modification procedure with the network node to establish or modify a network-based PDU session based on receiving the path switch response; and sending second information to the second WTRU for communication via the non-preferred Uu-based network communication link, and wherein the second information is sent to the second WTRU in accordance with the application-specific criteria.

12. The method of claim 11, further comprising receiving a message from a network node indicating that the path switching is allowed or policies for implementing path switching.

13. The method of claim 11, wherein the at least one trigger comprises the first WTRU being in a location area where path switching is allowed an indication from an application, or a Uu link quality being above a threshold.

14. The method of claim 11, further comprising:

establishing a PC5 unicast link with a third WTRU, and wherein the network-based PDU session is established based on the PC5 unicast link with the third WTRU.

15. The method of claim 11, further comprising:

receiving provisioning information, wherein the provisioning information comprises a path switch capability, one or more path switching policies, or a path switching information sharing method; and determining the at least one trigger for performing the paths switch is based on the provisioning information.

16. The method of claim 11, further comprising:

sending a path switch request to the second WTRU based on a determination that one or more triggers have occurred, wherein the path switching request indicates whether the preferred PC5 communication link should be preserved after path switching.

17. The method of claim 11, further comprising switching traffic or one or more proximity services from the preferred PC5 communication link to the non-preferred Uu-based network communication link.

18. The method of claim 11, further comprising:

sending a path switching request to the second WTRU via the preferred PC5 communication link;

receiving a path switching response from the second WTRU via the preferred PC5 communication link; and sending a path switching acknowledgement to the second WTRU.

19. The method of claim 11, wherein reception of the first information is indicative of the path switching request being accepted.

20. The method of claim 11, further comprising:

receiving an indication indicating the preferred PC5 communication link is the preferred communication link;

determining that a signal strength of the preferred PC5 communication link is less than the threshold to determine that the at least one trigger for performing the path switch from the preferred PC5 communication link to the non-preferred Uu-based network communication link has occurred; and determining to switch from the preferred PC5 communication link to the non-preferred Uu-based communication link, wherein the non-preferred communication link corresponds to the Uu-based network communication link.

* * * * *